United States Patent
Pham et al.

(10) Patent No.: US 7,334,124 B2
(45) Date of Patent: Feb. 19, 2008

(54) LOGICAL ACCESS BLOCK PROCESSING PROTOCOL FOR TRANSPARENT SECURE FILE STORAGE

(75) Inventors: Duc Pham, Cupertino, CA (US); Tien Le Nguyen, Cupertino, CA (US); Pu Paul Zhang, San Jose, CA (US); Mingchen Lo, Fremont, CA (US)

(73) Assignee: Vormetric, Inc., Santa Clara, CA (US)

( * ) Notice: Subject to any disclaimer, the term of this patent is extended or adjusted under 35 U.S.C. 154(b) by 634 days.

(21) Appl. No.: 10/201,409

(22) Filed: Jul. 22, 2002

(65) Prior Publication Data
US 2004/0015724 A1    Jan. 22, 2004

(51) Int. Cl.
*H04L 29/00* (2006.01)
*H04L 29/06* (2006.01)

(52) U.S. Cl. ............... 713/162; 713/160; 713/161; 713/162; 726/13; 709/245; 380/37

(58) Field of Classification Search ............... 713/160, 713/165, 182, 200–201, 173, 175, 154; 380/269, 380/37; 707/1; 708/9; 709/223–226, 229
See application file for complete search history.

(56) References Cited

U.S. PATENT DOCUMENTS

| | | | |
|---|---|---|---|
| 4,423,287 A | 12/1983 | Zeidler | |
| 4,503,287 A | 3/1985 | Morris et al. | |
| 4,588,991 A | 5/1986 | Atalla | |
| 4,649,233 A | 3/1987 | Bass et al. | |
| 5,007,082 A | 4/1991 | Cummins | |
| 5,065,429 A | 11/1991 | Lang | |
| 5,150,407 A | 9/1992 | Chan | |
| 5,235,641 A | 8/1993 | Nozawa et al. | |
| 5,235,642 A | 8/1993 | Wobber et al. | |
| 5,321,841 A | 6/1994 | East et al. | |

(Continued)

FOREIGN PATENT DOCUMENTS

JP     08272667     10/1996

(Continued)

OTHER PUBLICATIONS

IBM, IBM Network Processor (IBM32NPR161EPXCAC133) Product Overview, Published Oct. 4, 1999.

(Continued)

*Primary Examiner*—Syed A. Zia
(74) *Attorney, Agent, or Firm*—NewTechLaw; Gerald B. Rosenberg, Esq.

(57) ABSTRACT

Network data files are secure through the operation of an infrastructure gateway-based network file access appliance. Network file data, corresponding to network pocket payload data, are further reduced to a sequence of data blocks that are secured through any combination of block encryption, compression, and digital signatures. File meta-data, including encryption, compression and block-level digital signatures are persistently stored with the file data, either in-band in the file as stored or out-of-band key as a separately stored file or file policy record. File meta-data is recovered with accesses of the file data to support bidirectional encryption and compression and to detect tampering with the file data by comparison against block-level digital signatures.

31 Claims, 10 Drawing Sheets

U.S. PATENT DOCUMENTS

| | | |
|---|---|---|
| 5,349,642 A | 9/1994 | Kingdon |
| 5,412,717 A | 5/1995 | Fischer |
| 5,440,635 A | 8/1995 | Bellovin et al. |
| 5,453,979 A | 9/1995 | Schibler et al. |
| 5,463,772 A | 10/1995 | Thompson et al. |
| 5,506,961 A | 4/1996 | Carlson et al. |
| 5,539,883 A | 7/1996 | Allon et al. |
| 5,548,724 A | 8/1996 | Akizawa et al. |
| 5,550,984 A | 8/1996 | Gelb |
| 5,564,106 A | 10/1996 | Puhl et al. |
| 5,566,170 A | 10/1996 | Bakke et al. |
| 5,584,023 A | 12/1996 | Hsu |
| 5,586,260 A | 12/1996 | Hu |
| 5,596,718 A | 1/1997 | Boebert et al. |
| 5,602,918 A | 2/1997 | Chen et al. |
| 5,638,448 A | 6/1997 | Nguyen |
| 5,646,997 A * | 7/1997 | Barton ............ 713/176 |
| 5,649,099 A | 7/1997 | Theimer et al. |
| 5,655,120 A | 8/1997 | Witte et al. |
| 5,657,390 A | 8/1997 | Elgamal et al. |
| 5,680,461 A | 10/1997 | McManis |
| 5,682,478 A | 10/1997 | Watson et al. |
| 5,701,343 A | 12/1997 | Takashima et al. |
| 5,720,034 A | 2/1998 | Case |
| 5,754,791 A | 5/1998 | Dahlgren et al. |
| 5,765,176 A * | 6/1998 | Bloomberg ............ 715/514 |
| 5,774,668 A | 6/1998 | Choquier et al. |
| 5,784,463 A | 7/1998 | Chen et al. |
| 5,787,175 A | 7/1998 | Carter |
| 5,790,800 A | 8/1998 | Gauvin et al. |
| 5,819,045 A | 10/1998 | Raman et al. |
| 5,822,531 A | 10/1998 | Gorczyca et al. |
| 5,825,890 A | 10/1998 | Elgamal et al. |
| 5,850,395 A | 12/1998 | Hauser et al. |
| 5,850,446 A | 12/1998 | Berger et al. |
| 5,862,348 A | 1/1999 | Pedersen |
| 5,872,783 A | 2/1999 | Chin |
| 5,905,725 A | 5/1999 | Sindhu et al. |
| 5,912,972 A * | 6/1999 | Barton ............ 713/176 |
| 5,918,074 A | 6/1999 | Wright et al. |
| 5,922,073 A | 7/1999 | Shimada |
| 5,931,947 A | 8/1999 | Burns et al. |
| 5,940,507 A | 8/1999 | Cane et al. |
| 5,941,947 A | 8/1999 | Brown et al. |
| 5,974,463 A | 10/1999 | Warrier et al. |
| 6,006,259 A | 12/1999 | Adelman et al. |
| 6,038,668 A | 3/2000 | Chipman et al. |
| 6,052,785 A | 4/2000 | Lin et al. |
| 6,061,650 A | 5/2000 | Malkin et al. |
| 6,061,796 A | 5/2000 | Chen et al. |
| 6,078,943 A | 6/2000 | Yu |
| 6,078,960 A | 6/2000 | Ballard |
| 6,084,969 A | 7/2000 | Wright et al. |
| 6,091,720 A | 7/2000 | Bedard et al. |
| 6,104,716 A | 8/2000 | Crichton et al. |
| 6,157,649 A | 12/2000 | Peirce et al. |
| 6,157,955 A | 12/2000 | Narad et al. |
| 6,158,011 A | 12/2000 | Chen et al. |
| 6,160,819 A | 12/2000 | Partridge et al. |
| 6,173,306 B1 | 1/2001 | Raz et al. |
| 6,175,924 B1 | 1/2001 | Arnold |
| 6,185,681 B1 | 2/2001 | Zizzi |
| 6,185,684 B1 | 2/2001 | Pravetz et al. |
| 6,199,077 B1 * | 3/2001 | Inala et al. ............ 715/501.1 |
| 6,202,157 B1 | 3/2001 | Brownlie et al. |
| 6,219,790 B1 | 4/2001 | Lloyd et al. |
| 6,246,771 B1 | 6/2001 | Stanton et al. |
| 6,249,866 B1 | 6/2001 | Brundrett et al. |
| 6,252,878 B1 | 6/2001 | Locklear, Jr. et al. |
| 6,253,193 B1 | 6/2001 | Ginter et al. |
| 6,253,321 B1 | 6/2001 | Nikander et al. |
| 6,259,699 B1 | 7/2001 | Opalka et al. |
| 6,260,155 B1 | 7/2001 | Dellacona |
| 6,263,445 B1 | 7/2001 | Blumenau |
| 6,266,705 B1 | 7/2001 | Ullum et al. |
| 6,266,740 B1 * | 7/2001 | Don et al. ............ 711/114 |
| 6,272,522 B1 | 8/2001 | Lin et al. |
| 6,282,652 B1 | 8/2001 | Scheifler |
| 6,286,104 B1 | 9/2001 | Buhle et al. |
| 6,292,827 B1 | 9/2001 | Raz |
| 6,304,973 B1 | 10/2001 | Williams |
| 6,327,622 B1 | 12/2001 | Jindal et al. |
| 6,330,677 B1 | 12/2001 | Madoukh |
| 6,351,775 B1 | 2/2002 | Yu |
| 6,353,886 B1 | 3/2002 | Howard et al. |
| 6,377,577 B1 | 4/2002 | Bechtolsheim et al. |
| 6,378,072 B1 | 4/2002 | Collins et al. |
| 6,405,315 B1 | 6/2002 | Burns et al. |
| 6,424,621 B1 | 7/2002 | Ramaswamy et al. |
| 6,438,612 B1 | 8/2002 | Ylonen et al. |
| 6,438,652 B1 | 8/2002 | Jordan et al. |
| 6,470,389 B1 | 10/2002 | Chung et al. |
| 6,477,644 B1 | 11/2002 | Turunen |
| 6,480,861 B1 | 11/2002 | Kanevsky et al. |
| 6,487,605 B1 | 11/2002 | Leung |
| 6,493,318 B1 | 12/2002 | Bare |
| 6,493,341 B1 | 12/2002 | Datta et al. |
| 6,496,932 B1 | 12/2002 | Trieger |
| 6,499,110 B1 | 12/2002 | Moses et al. |
| 6,502,192 B1 | 12/2002 | Nguyen |
| 6,505,254 B1 | 1/2003 | Johnson et al. |
| 6,505,300 B2 | 1/2003 | Chan et al. |
| 6,519,636 B2 | 2/2003 | Engel et al. |
| 6,529,950 B1 | 3/2003 | Lumelsky et al. |
| 6,539,483 B1 | 3/2003 | Harrison et al. |
| 6,542,992 B1 | 4/2003 | Peirce et al. |
| 6,560,217 B1 | 5/2003 | Peirce et al. |
| 6,571,287 B1 | 5/2003 | Knight et al. |
| 6,584,508 B1 | 6/2003 | Epstein et al. |
| 6,594,763 B1 | 7/2003 | Madoukh |
| 6,647,400 B1 | 11/2003 | Moran |
| 6,665,666 B1 | 12/2003 | Brown et al. |
| 6,671,773 B2 | 12/2003 | Kazar et al. |
| 6,845,395 B1 * | 1/2005 | Blumenau et al. .......... 709/223 |
| 7,158,637 B2 * | 1/2007 | Ohta et al. .................. 380/37 |
| 2001/0016907 A1 | 8/2001 | Kang et al. |
| 2001/0047400 A1 | 11/2001 | Coates et al. |
| 2002/0091734 A1 | 7/2002 | Redlich et al. |
| 2002/0184487 A1 | 12/2002 | Badamo et al. |
| 2002/1094495 | 12/2002 | Gladstone et al. |
| 2003/0046366 A1 | 3/2003 | Pardikar et al. |
| 2003/0056095 A1 | 3/2003 | Elliott et al. |
| 2003/0112977 A1 | 6/2003 | Ray et al. |
| 2003/0196114 A1 | 10/2003 | Brew et al. |

FOREIGN PATENT DOCUMENTS

| | | |
|---|---|---|
| WO | WO 9900958 | 1/1999 |
| WO | WO 01/37095 | 5/2001 |
| WO | WO 02/093314 | 11/2002 |
| WO | WO02-093314 A2 | 11/2002 |
| WO | WO02-093314 A3 | 11/2002 |
| WO | WO 02/093389 | 11/2002 |
| WO | WO 02/103498 | 12/2002 |

OTHER PUBLICATIONS

BROADCOM, BCM5820 E-Commerce Product Brief, 5820-PB00-R-3.26.01, Published 2001.
BROADCOM, BCM5840 Gigabit Security Processor Product Brief, 5840-PB00-R-12.6.00, Published 2000.
IBM, The Network Processor—Enabling Technology for High-Performance Networking, Published Aug. 1999.
IBM, Packet Routing Switch PRS28G Product Sheet, Undated.

IBM, Packet Routing Switch PRS28G, Version 1.7 Datasheet, prs28.04.fm, Feb. 6, 2001.

IBM, IBM PowerNP™ NP4GS3 Network Processor Preliminary Datasheet, May 18, 2001.

IBM, Product Overview, IBM PowerNP NP4GS3, Network Processor Solutions, Apr. 16, 2001.

Alan Radding, Storage ROI: Truth & Fiction, Infoworld Custom Meda Group, 2001.

IETF, IP Storage Working Group, iSCSI Requirements and Design Considerations, Document: draft-ietf-ips-iscsi-reqmts-05.txt, Jul. 2001.

IETF, IP Security Working Group, Security Properites of the IPsec Protocol Suite, Document draft-krywaniuk-ipsec-properties-00.txt, Jul. 9, 2001.

IETF, iSCSI, Document draft-ietf-ips-iscsi-08.txt, Sep. 30, 2001.

IBM Technical Disclosure Bulletin, "Real-Time Mechanism for Accounting And Network Access Control", Apr. 1, 1994, vol. 37, pp. 337-340.

Yoshida et al., Virtualization—The Promise and the Reality, Sun Microsystems White Paper, 2001.

Bertino et al., Advanced Transaction Processing in Multilevel Secure File Stores, 1998 IEEE.

Cattaneo et al., The Design and Implementation of Transparent Cryptographic Filesystems for UNIX, Jun. 2001.

Ludwig et al., File System encryption with Integrated Usr Management, Oct. 2001 ACM.

O'Connell et al., JFS: A Secure Distributed File System for Network Computers, 1999.

* cited by examiner

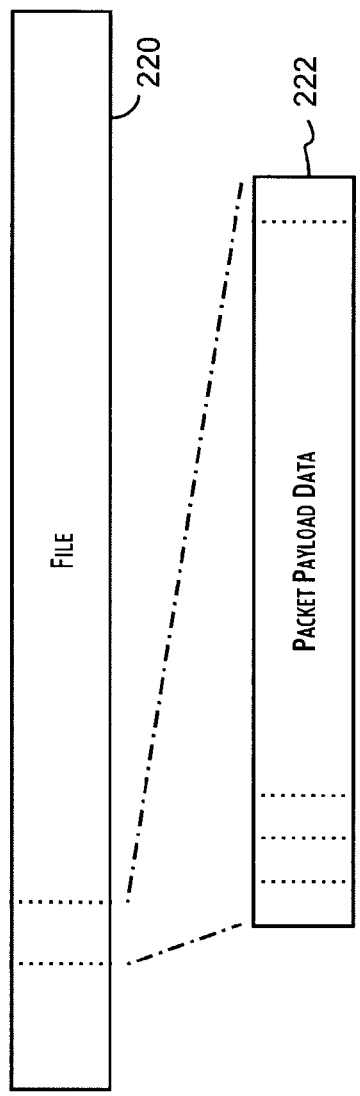
FIG. 8A
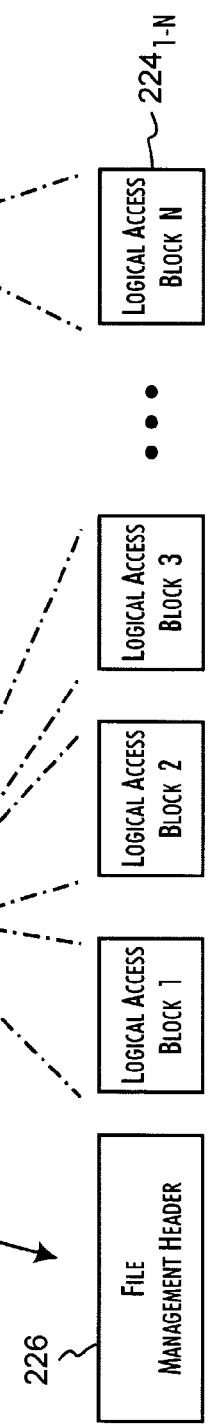
FIG. 8B
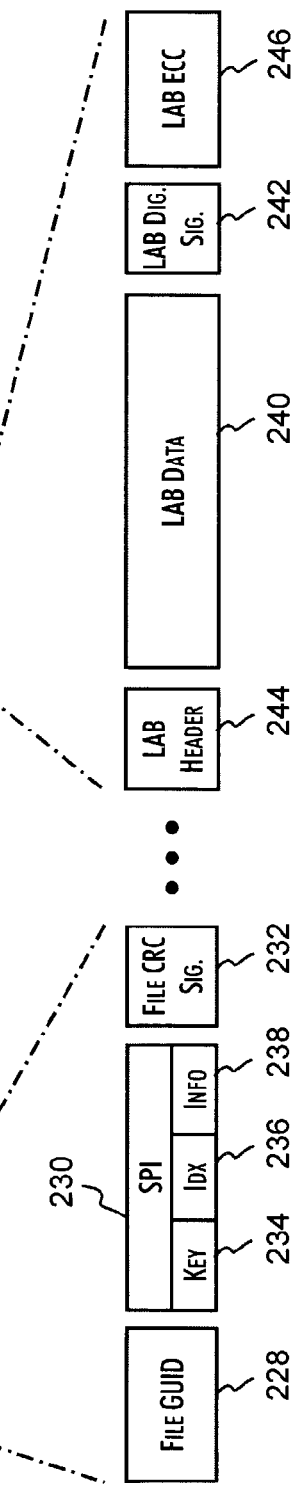
FIG. 8C
FIG. 8D

FIG. 11A
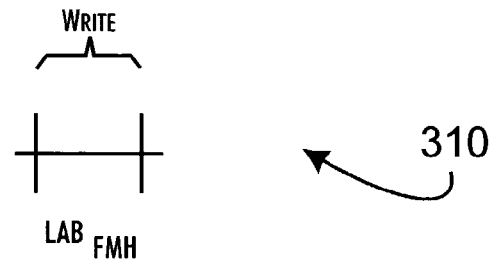
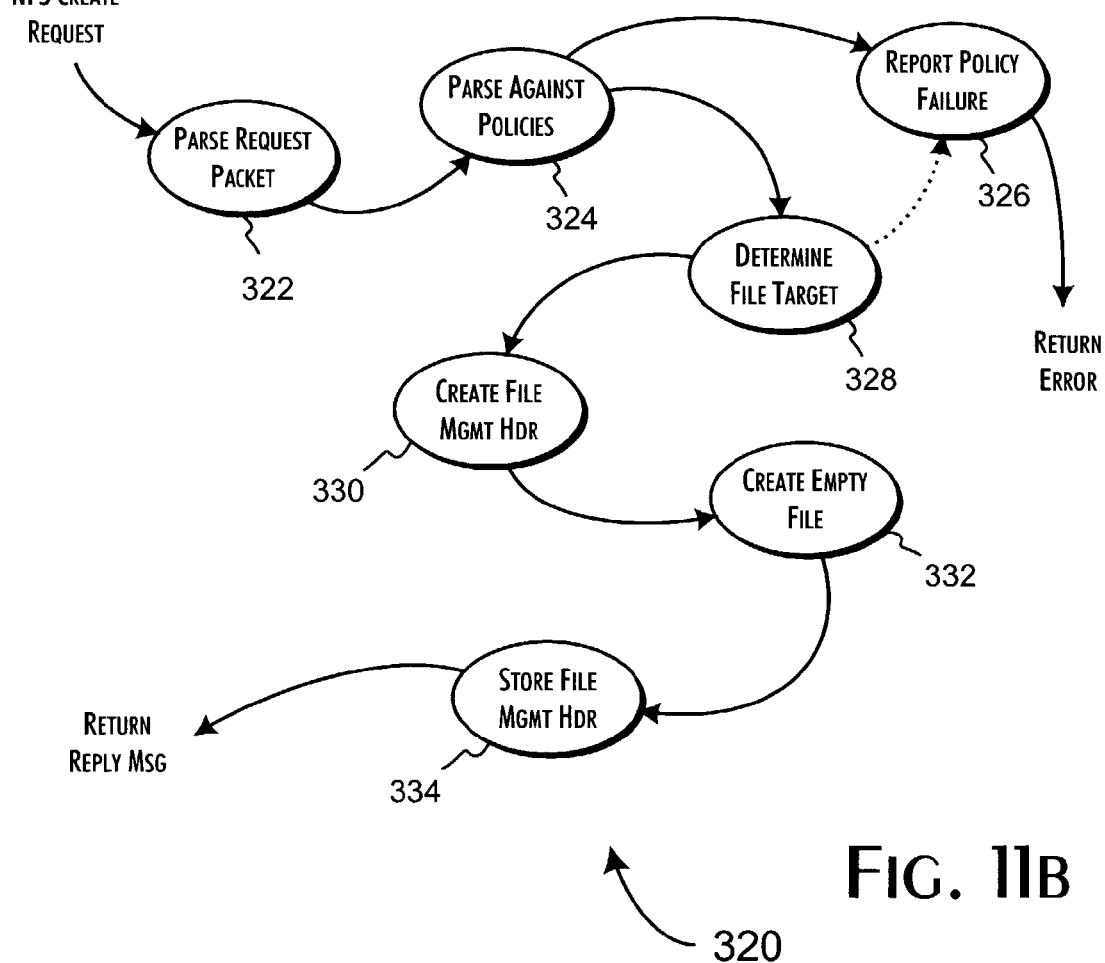
FIG. 11B

LOGICAL ACCESS BLOCK PROCESSING PROTOCOL FOR TRANSPARENT SECURE FILE STORAGE

BACKGROUND OF THE INVENTION

1. Field of the Invention

The present invention is generally related to network infrastructure devices supporting network access to remotely stored data and, in particular, a secure network file storage protocol and secure file data storage format supporting encryption, compression, and tampering controls over-file data stored by remote file data stores.

2. Description of the Related Art

The use and concomitant evolution of network information systems continues to grow at a substantial pace. Organizations of all sizes, though particularly larger, typically corporate environments, are producing and redeploying information at increasing rates as part of the fundamental business processes implemented by those organizations. In a typical scenario, such as encountered in many parts of the financial, scientific, and manufacturing industries, various files detailing transactions are routinely created and centrally stored for individual and aggregate processing. This same information is then routinely redeployed for interactive use by captive customer service representatives, select component and service suppliers, and often for limited end user access through typically Web-based network interfaces. File stores that measure in the range of tens to hundreds of terabytes are commonplace.

As an initial matter, the growth in the volume and need for wide accessibility of information is reflected in increasing interest in network attached storage (NAS) and storage area networks (SANs). These technologies support a network-based storage architecture that enables a fundamental independence between the various client, application and network server systems used to access and process stored data and the expansion, configuration, and management of large data storage systems. Other fundamental capabilities provided by network-based storage architectures include the ability to geographically distribute and, further, replicate the data stores, which permit remote data backup and hot fail-over of typically business and real-time transaction processing storage systems.

While the many enabling capabilities of network-based storage architectures are of substantial value, issues of authentication, access control, and security over the stored data remain. Indeed, the ubiquitous data accessibility inherently afforded by network-based storage architectures is commonly viewed as greatly exacerbating the problems of assuring authentication, access, and security control. The network transport costs associated with delivering and accessing remotely stored data is also recognized as a significant problem.

Conventional direct attached storage (DAS) architectures, involving application and network servers with dedicated, locally attached storage arrays, have evolved various forms of authentication, access and security controls to protect stored data. These controls run from basic operating system password authentication and access permission attributes to smart cards and physical access barriers. The successive layering of these controls can be used to progressively harden the underlying direct-attached storage.

While some of the conventional protection controls remain generally applicable to network-based storage architectures, many are, as a practical matter, ineffective. In network-based storage architectures, the storage accessing application servers are typically remotely distributed, which generally precludes any assurance that authorization, access, and security controls are not intentionally or inadvertently circumvented. Even fewer assurances exist for the remotely distributed client computer systems permitted access to the network shared with the network storage.

The vulnerabilities of conventional network-based storage architectures are appreciated and, as a result, have significantly limited the rapid adoption of NAS and SAN technologies. Other technologies, such as virtual private networking (VPN), are useful in overcoming certain of the limitations of network-based storage architectures. VPNs support a robust encryption of data in transport between the endpoint systems within a VPN session. Thus, conventional VPNs can be used to provide point-to-point security over data transported between various client computer systems, application servers, and the network storage systems.

VPN and similar technologies, however, fail to support any meaningful access controls or assure the continuing security of data once delivered to a VPN endpoint system. The underlying protocols were simply not designed to provide or enforce storage-type access controls. VPN data, while encrypted and secure during transport, is delivered to a VPN host endpoint subject only to the access controls implemented by the host. The data is also delivered unencrypted and thus again subject only to the security controls provided by the host.

Other technologies can be potentially employed to layer general access and security controls onto the secure transport capabilities of VPN and similar technologies. Various standard protocols, such as the Kerberos protocol (web.mit.edu/kerberos/www/) and the Lightweight Directory Access Protocol (LDAP; www.openldap.org) can be utilized to differing degrees to provide secure authentication, directory services, and access controls. Encrypting file systems can be utilized to secure file data as stored. Together, these technologies can provide for a well-hardened storage of data within a network-based storage architecture. Considering the requisite separate administration of these technology layers over disparate client computer systems and application servers, however, makes assuring that data is properly subject to rigorously enforced authentication, access and security controls practically impossible.

Consequently, there remains a fundamental, unsolved tension between ensuring only properly secure access to network-based stored data and enabling appropriate widespread access to the data in fulfillment of business process requirements.

SUMMARY OF THE INVENTION

Thus, a general purpose of the present invention is to provide an efficient, secure network file storage protocol and secure file data storage format, preferably implemented through a secure infrastructure appliance operating as a managed portal between client computer systems and network storage, supporting encryption, compression, and tampering controls over file data stored by remote file data stores.

This is achieved in the present invention by securing network data files, preferably through the operation of an infrastructure gateway-based network file access appliance, by the implementation of a low-level file block security protocol and storage format. Network file data, corresponding to network packet payload data, are further reduced to a sequence of data blocks that are secured through any combination of block encryption, compression, and digital signatures. File meta-data, including encryption, compression and block-level digital signatures are persistently stored with the file data, either in-band in the file as stored or out-of-band key as a separately stored file or file policy record. File meta-data is recovered with accesses of the file data to support bidirectional encryption and compression and to detect tampering with the file data by comparison against block-level digital signatures.

An advantage of the present invention is that the secure network file access appliance extends comprehensive authorization, access and security services from the user level down to the physical file storage level. Authorization protocol compliance on client systems is actively enforced as a prerequisite for file accesses subject to the security services provided by the secure network file access appliance. Authorized file access requests, originating from an authorized application executed within an authorized session and process, are signed by the agent upon transmission to the secure network file access appliance. Multiple access policies are established to differentially qualify received file access requests, including verifying the agent signature to establish request authenticity and evaluating user and group permissions to establish file access rights. Access policies further define encryption and compression services that are applied to file data transmitted between the secure network file access appliance and network storage. Encryption of the network file data, including the transparent storage of the encrypted file data by the network storage system, ensures the integrity of network file data while within the management scope of the secure network file access appliance. Authentication, access policy, and encryption and compression service exceptions are recognized as intrusion and tampering events that can be, subject to the applicable access policies, logged, issued as administrative alerts, and used as a basis for autonomous protection activities, such as blocking all file access requests from a client network address.

Another advantage of the present invention is that the secure network file access appliance maintains a secure store of the security encryption keys and operates autonomously to associate the applicable encryption key with encrypted file data as retrieved from a network file store. Meta-data, stored and retrieved automatically in association with the encrypted file data, provides a persistent encryption key identifier that is used to identify a correct encryption key for the file data.

A further advantage of the present invention is that the authorization, access and security services performed by the secure network file access appliance are performed at wire-speed, enabling the full function of the secure network file access appliance to be transparent to the normal operation of both client systems and network storage systems. Data files, as encrypted by the secure network file access appliance, are presented as conventional data files to the network storage system. The encryption of network data files is therefore transparent to network storage systems, permitting the network data files to be conventionally manipulated using existing management tools, including backup and restore utilities, yet without permitting compromise of the security of the data file content.

Still another advantage of the present invention is that the secure network file access appliance can implement data compression in combination with encryption to minimize the bandwidth requirements of secure file transfers as well as the size of the secured file data as stored. The connection throughput necessary to maintain a hot-backup and the storage space necessary for progressive archival file backups are reduced. File data compression is accomplished with minimal degradation in the wire-speed operation of the secure network file access appliance.

Yet another advantage of the present invention is that the secure network file access appliance is implemented as an infrastructure component, permitting easy integration in existing as well as new network systems. The secure network file access appliance particularly supports remote access to geographically distributed network storage systems. An additional layer of access security control is provided through the integral implementation of firewall filtering of the network connections, thereby supporting centrally managed and configurable protections against external access attacks as well as improper internal access attacks.

BRIEF DESCRIPTION OF THE DRAWINGS

These and other advantages and features of the present invention will become better understood upon consideration of the following detailed description of the invention when considered in connection with the accompanying drawings, in which like reference numerals designate like parts throughout the figures thereof, and wherein:

FIGS. 8A-D illustrates the preferred decomposition of file data through the network packet protocol processing implemented in accordance with a preferred embodiment of the present invention;

FIGS. 11A-B illustrate the process flow of a file system file create request performed in accordance with a preferred embodiment of the present invention.

DETAILED DESCRIPTION OF THE INVENTION

Figure 1:
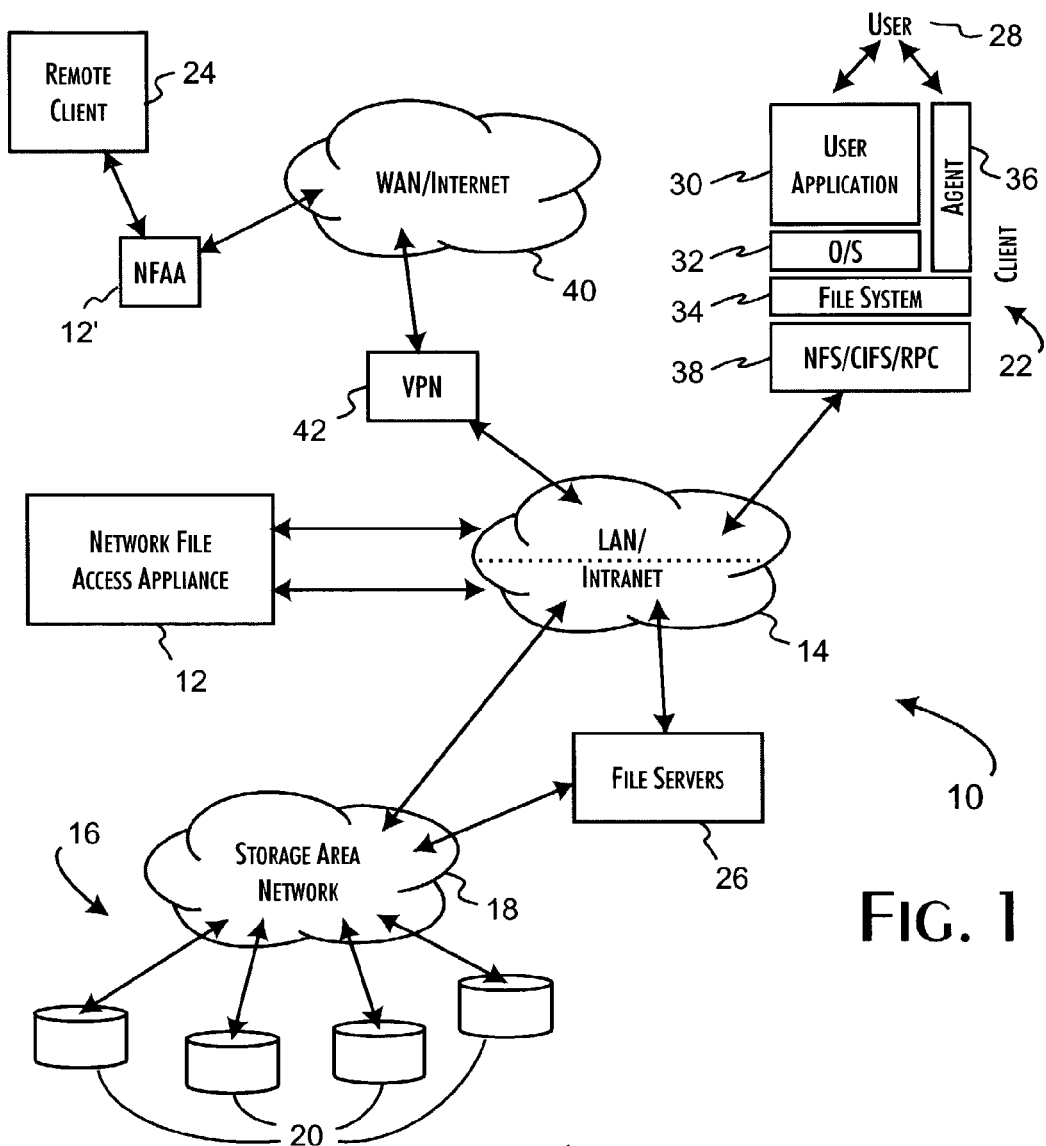
FIG. 1 is a top level diagram illustrating the operating environment of a preferred embodiment of the present invention.

Secure network file access appliances, implemented in accordance with the present invention, can be effectively utilized in a wide variety of network infrastructure configurations. An exemplary infrastructure environment 10 is shown in FIG. 1. A secure network file access appliance 12 is preferably implemented in the environment 10 within an intranet infrastructure 14 to operate as a communications channel between protected network storage resources 16, such as a SAN 18 and network attached storage devices 20, and client computer systems 22, 24. The secure network file access appliance 12 selectively encrypts, as determined by access policies implemented within the secure network file access appliance 12, file data stored to the network storage resources 16. In accordance with the present invention, the file data encryption maintains the logical file-oriented structure of the data and is thus transparent to the network storage resources 16. Furthermore, the secure network file access appliance 12 preferably supports operation as an IP firewall, permitting the secure network file access appliance 12 to function as an exclusive infrastructure path through the intranet infrastructure 14.

Network and other servers 26 implemented as part of the infrastructure 14 between the secure network file access appliance 12 and network storage resources 16 or as part of a NAS resource 16, 26, are unaffected by the encryption function of the secure network file access appliance 12, yet are secured against unauthorized access of the encrypted content. Actively used file data encryption keys are preferably held and managed within the secure network file access appliance 12 alone. Network accessible trusted agent systems, providing conventional secure key archive services to the secure network file access appliance 12, can be relied upon to provide long-term storage and support on-demand retrieval of keys. The encryption keys are not stored on or directly accessible in usable form from the network attached storage devices 20 or network servers 26.

Preferably, the secure network file access appliance 12 processes file data read and write requests in aggregate at wire-speed and with minimal latency in qualifying the access privileges of each read, write, and related file access request, to selectively encrypt and decrypt file data transferred, and further selectively compress and decompress the transferred file data. The round-trip encryption of file data ensures that transfers to remote network storage resources 16 over unsecured networks including the Internet effectively remain secure. Round-trip compression substantially reduces the needed file data transfer bandwidth, particularly where the transfers are for repeated mass archival backups.

Implementation of comprehensive access policy controls at the secure network file access appliance 12, essentially independent though additive to those of the network storage resources 16 and file servers 26, enables centralized file data access management. The access permissions and other controls implemented by the network storage resources 16 and file servers 26 are difficult to globally maintain through additions and reconfigurations of the network attached storage devices 20 due to the typically remote and distributed nature of the network storage resources 16 and file servers 26. The access policy controls provided by the secure network file access appliance 12 are significantly more comprehensive, flexible, and administratively uniform than conventional access permissions implemented by the various network storage resources 16.

Authentication controls are supported by the secure network file access appliance 12 as a complement to the access policy controls. For the preferred embodiments of the present invention, authentication agent code is installed and executed on clients 22, 24 to enable user and client authentication, including authentication over user sessions and processes. For the client 22, a user 28 may represent an individual or a remotely connected computer system utilizing the client 22 as a network file, Web, or application server, executing conventional user applications 30 supported by a conventional network capable operating system 32.

A modified file system 34 provides for selective authentication processing of file system requests directed to the network storage resources 16, including through network servers 26. For the preferred embodiments of the present invention, the file system 34 is mounted through a file system switch facility supported by the operating system 32 against the directory nodes representing network storage resources 16. Authentication logic provided in an agent program 36, executing largely if not exclusively in kernel space, is called in response to file system operations directed against the file system 34. Through the operating system 32, the agent program 36 has access to user, client, process, application, and session information. Where attended user authentication is required, the agent program 36 preferably interoperates through the operating system 32 to assert an authentication dialog for the user 30. User responsive information can then be authenticated using standard authentication controls, such as LDAP and other network available authentication servers (not shown). Alternately, or in combination, the user authentication response information can be transmitted to the secure network file access appliance 12 for security qualification.

Authentication of user applications 30 is performed autonomously through the agent program 36. Preferably in response to a first file system operation by a user application 30, as received by the file system 34, or on notice from the operating system 32 of the invocation of the user application 30, the agent program 36 generates a secure hash identification of the loaded binary image of the user application 30. This hash identifier and the application file attributes are then transmitted to the secure network file access appliance 12 for verification. An authentication response is returned to the agent program 36 providing verification status. A verification failure or other exception indicated by the secure network file access appliance 12 preferably results in a disallowance of the requested file system operation.

Unattended execution of applications by a client 22, such as on booting of the client 22, can be supported through the application authentication mechanism. Preferably, an application launcher utility is scripted to execute on boot. Through application authentication of the utility, the absence of attended user authentication derived information is not treated as an exception by the secure network file access appliance 12. The application launcher utility is then enabled to launch a designated application 30.

The state of user and application authentication, in combination with user session and associated process identifiers, is preferably maintained by the agent program 36. In the preferred embodiments of the present invention, this authentication information and the digital signature of the agent program 36 are combined and sent encrypted to the secure network file access appliance 12 with each file system request passed by the modified file system 34. A network layer 38, including an NFS/CIFS network file system layer, modified to include the user and agent authentication information with file system requests, is used to communicate with the secure network file access appliance 12. In the preferred embodiment, an NFS packet header field is extended, preferably by redefinition of an existing field, to store and transfer the user and agent authentication information. Additionally, periodic or heartbeat status remote procedure call (RPC) packets are sent by the agent program 36 to the secure network file access appliance 12 reflecting the current state of the user and agent authentication information. Client changes relevant to authentication, including specifically terminations of processes and user sessions, are thereby rapidly noticed to the secure network file access appliance 12.

The transport of file data between the secure network file access appliance 12 is generally secure where a client, such as client 22, is part of the local infrastructure 14. Where the transport extends to remote clients, such as client 24, over an unsecure network, such as the Internet 40, conventional transport security protocols can be transparently employed. As shown, a virtual private network 42, can be utilized without interference with the authentication of users 30 in accordance with the present invention. Alternatively, or in addition, a secure network file access appliance 12' can be deployed locally with respect to the remote client 24, thereby securing the transport of file data effectively between the remote client 24 and network storage resources 16.

Figure 2:
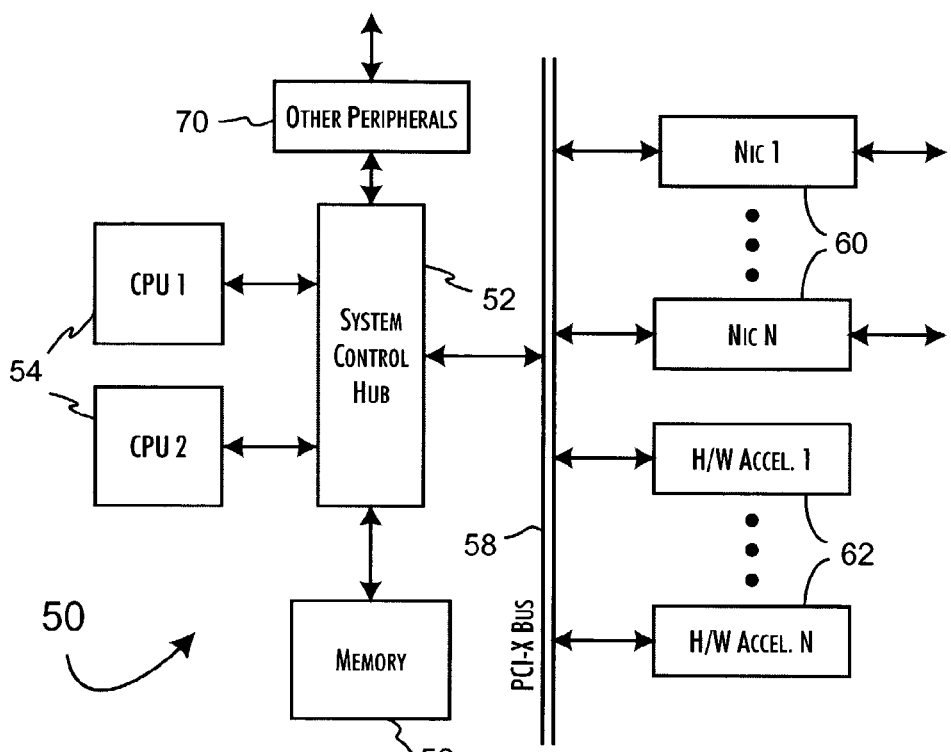
FIG. 2 is an architectural block diagram of a preferred, fixed scale appliance embodiment of the present invention.

A preferred, fixed scale, hardware platform 50 for the present invention is shown in FIG. 2. The platform 50 is preferably implemented on a motherboard supporting the Intel® E7500 chipset 52, dual 2.2 GHz Intel® Xeon™ processors 54 (Intel Corporation, Santa Clara, Calif.; www.intel.com), and a 1-Gbyte 200-MHz Double Data Rate (DDR) main memory array 56. The chipset 52 supports six PCI-X buses 58, individually capable of over 8-Gbps throughput and an aggregate throughput of at least 24-Gbps. A basic configuration of two 1-Gbps network interface controllers, supporting ingress and egress network connections, and one 10/100 Mbps network interface controller, supporting a management network connection, are connected to the PCI-X bus 58. A base configuration of three HiFn™ 7851 security processors 62 (Hifn, Inc., Los Gatos, Calif.; www.hifn.com) provides hardware accelerated encryption and compression support for the generic data processing and control function of the processors 54. The security processors support symmetric programmable length block encryption algorithms, including 3-DES, at throughputs in excess of 400-Mbps per chip and programmable length block compression algorithms, including LZS, at throughputs in excess of 80 MBps.

Other peripherals 70, including a BIOS program and boot hard disk drive, are supported though the chipset 52 to enable basic operation of the platform 50. Preferably, the platform 50 boots and runs a Linux™ based operating system, based on a commercial distribution of Red Hat™ Linux (Red Hat, Inc., Raleigh, N.C.; www.redhat.com). The software-based authentication and access functions of the secure network file access appliance 12 preferably load and execute in the Linux kernel space. Administrative and support utilities are preferably implemented as user-mode applications and daemons.

Figure 3:
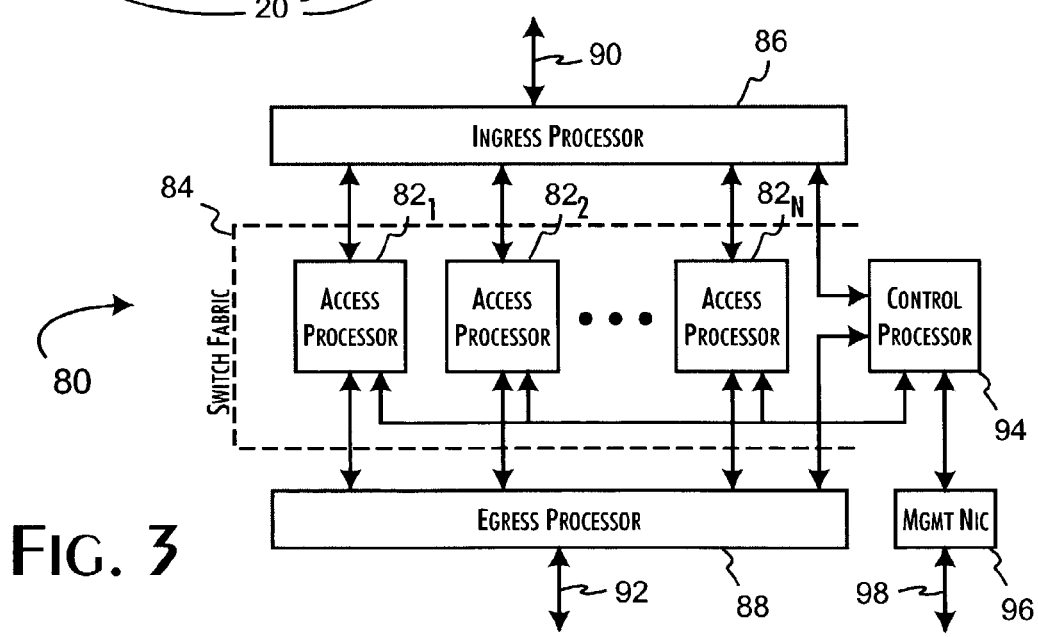
FIG. 3 is an architectural block diagram of an alternate, highly-scalable appliance embodiment of the present invention.

An alternate, high-throughput, scalable hardware platform 80 for the secure network file access appliance 12 is shown in FIG. 3. This scalable architecture is generally consistent with the architecture disclosed in Network Media Encryption Architecture and Methods for Secure Storage, Ser. No. 10/016,897, filed Dec. 3, 2001 by Pham et al., which is hereby incorporated by reference. In brief, multiple blade-based access processors $82_{1-N}$ each preferably implements a central processor executing an instance of an embedded Linux operating system. One or more encryption and compression security processors are provided on each blade as hardware acceleration engines. In place of the direct network interface connections 62, packet connections through a high-speed switch fabric 84 provide data paths to an ingress processor 86 and an egress processor 88 that serve as packet routers to 10 Gbps or higher throughput network infrastructure connections 90, 92.

A control processor blade 94 manages and monitors the other blades $82_{1-N}$, 88, 90. The control processor blade 94 supports the booting of the embedded operating system instances on the hblades $82_{1-N}$, 88, 90 and coordinates the sharing of common encryption and compression configuration and control information between the access processor blades $82_{1-N}$. A separate management network interface controller 96 is provided to enable independent access to the control processor 94 from the management network 98.

Figure 4:
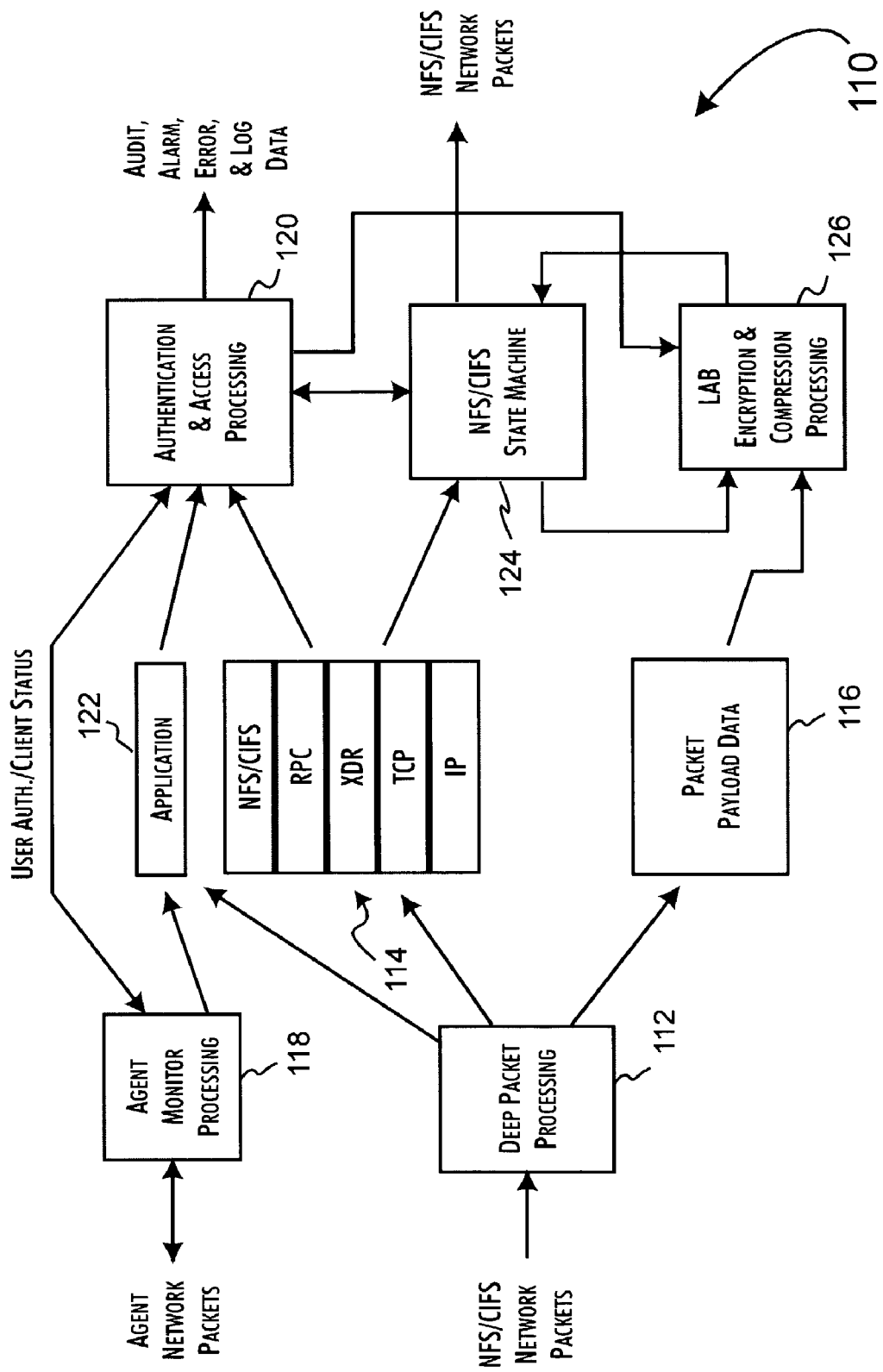
FIG. 4 is a process flow diagram illustrating the deep packet analysis processing provided in accordance with the present invention to support authentication and access qualification of client file oriented network requests directed to network storage resources.

The logical control and protocol processing functions implemented in the control programs executed on a platform 50 for a preferred embodiment of the present invention are shown in FIG. 4. Inbound file requests are received as network data packets containing the various network file system messages implemented by a network distributed file system, such as the network file system (NFS) and common internet file system (CIFS). These network data packets are processed to expose the control information 114 contained in the protocol layers of each received data packet and the packet payload data 116 for examination and processing.

Additionally, application and status information is gathered by an agent monitoring process 118 listening on a dedicated network port from network connected clients 22, 24. Client status information, obtained from heartbeat network packets, is relayed to an authentication and access control process 120. Continuity of a client heartbeat is used to maintain a client authorization session. User authentication session information, minimally reflecting that a user authentication sequence mediated by the agent program 36 has completed successfully, can also be provided to the authentication and access control process 120 within the heartbeat data packets. Transmission of user authentication session information at checkpoint intervals serves to protect against conversion of any client process for the execution of unauthorized applications. Where the authentication and access control process 120 operates directly as an authentication server, user and client identifiers and user password acquired by the agent program 36 are relayed through the agent monitor process 118. Authorization responses are generated and returned by the authentication and access control process 120 based on the user and client authentication policy information maintained by the authentication and access control process 120.

Figure 5:
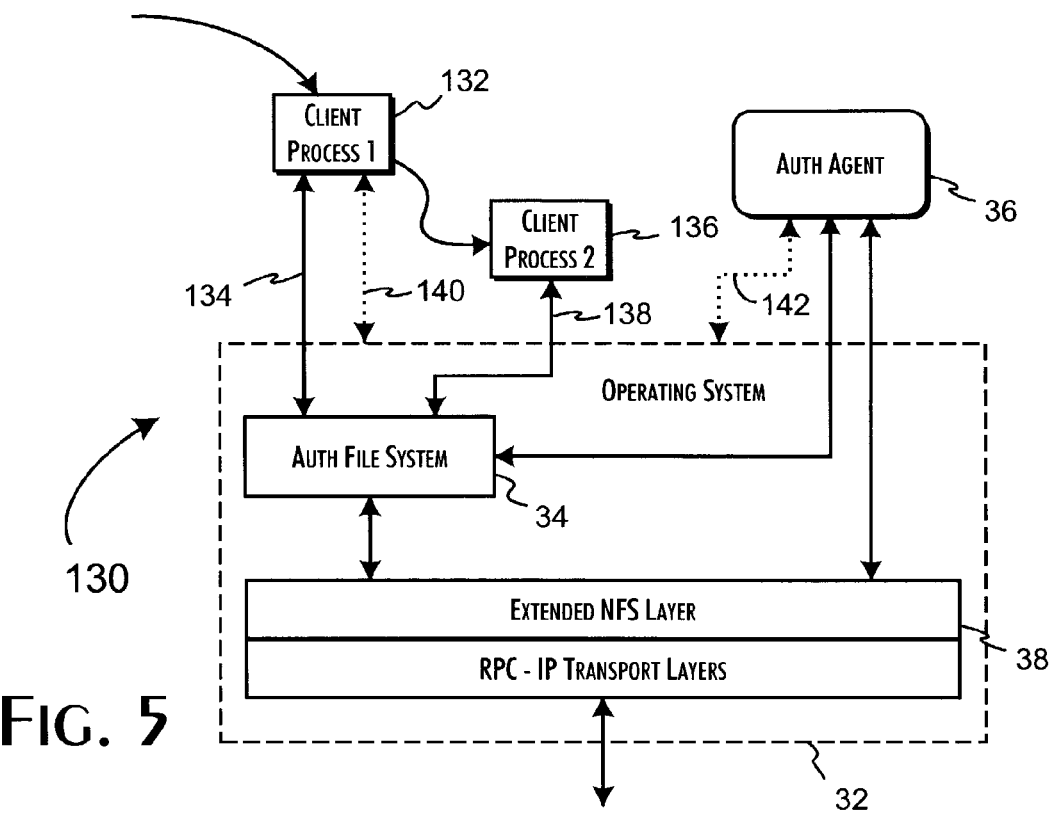
FIG. 5 provides a process interaction diagram showing the interoperation of client processes with an authentication agent executed by a client computer system.

In reference to FIG. 5, authentication enforcement is enabled by requiring a call to the agent program 36 in connection with the initialization of a new user process 132. User authentication is performed directly by a user mode component of the agent program 36 through a conventional authentication service, such as LDAP, against a user login and password. Alternately, user authentication can be direct-through a pluggable authentication module generally consistent with DCE/OSF-RFC 86.0 (Unified Login with Pluggable Authentication Modules (PAM); www.opengroup.org/tech/rfc/rfc86.0.html). In either case, the agent program 36, on authentication of the user, establishes an authenticated user session defined by the login process identifier (LPID), a user identifier (UID), and a group identifier (GID), as established by and obtained from the operating system 32.

The authentication modified filesystem 34 receives file requests 134 issued by a user process 132. A kernel mode portion of the agent program 36, operating in conjunction with the authentication modified filesystem 34, determines the source process identifier for each file request 134 by accessing operating system 32 structures. The authenticated user session information maintained by the agent program 36, located by the determined process identifier, is then provided to the modified network layer 38 for inclusion in the network file system requests 134 as processed through the network layer 38.

Client processes 136 spawned from an authenticated process 132 remain part of the parent authenticated user session. The chain of parent process identifiers is traced by the agent program 36 to associate file requests 138 from child processes 136 with corresponding authenticated user sessions. Preferably, to support access management at the level of individual processes, both the authenticated user login parent process identifier (LPID) and the current process identifier (PID) are provided to the modified network layer for inclusion in the session and process corresponding file requests forwarded to the secure network file access appliance 12.

In a preferred embodiment of the present invention, the authenticated user session information, including a session identifier generated by the agent program 36, is encrypted using a session key obtained through a secure key exchange with the agent monitoring process 118. The resulting extended NFS requests thus securely transport the session control information, including at least a session identifier, request source IP, user identifier, group identifier, and process identifiers to the secure network file access appliance 12.

Preferably, the agent program 36 supports authentication of user applications 30 as loaded for execution in the authenticated user session processes 132, 136. Digitally signed applications loaded for execution can be verified conventionally by the agent program 36 against digital certificates obtained from a trusted PKI, LDAP or other authentication server. Application authentication information, such as the identity of the authentication server and certificate, can be potentially included by the modified network layer 38 with the session information provided with corresponding file requests to support auditing of independently verified applications.

Autonomous application authentication by the agent program 36 is also supported through the secure network file access appliance 12. On the loading of an application for execution in a process 132, 136, the agent program 36 is called and executes, through the operating system 32, to locate 142 the application binary image and retrieve the application file attributes, including the application filename, path, permissions, and file size. A secure hash signature is generated for the application binary. In a preferred embodiment of the present invention, a 20-byte hash signature is generated using the SHA-1 algorithm. An application authentication request, containing the hash signature, file attributes and a secure application token, is then passed to the secure network file access appliance 12 in an RPC directed to the agent monitoring process 118. The secure application token preferably includes a public key, of a public/private key pair stored by the secure network file access appliance 12 or trusted third-party authentication server, an application name, and a structure containing a secure hash signature of the application binary image and the application file attributes encrypted with the public key. The token is prior administratively generated through the secure network file access appliance 12 or other trusted application authenticator against an administratively determined authentic application. The tokens for authenticated applications are stored on or otherwise made accessible to the clients 22, 24. The application file name located for the loaded binary image is used to further locate a corresponding token by the agent program 36.

On presentation of an application authentication request, the secure network file access appliance 12 compares the public key provided within the token against known valid public keys prior administratively registered with the secure network file access appliance 12. The decrypted token hash signature and file attributes are verified against the hash signature and file attributes separately provided in the request by the agent program 36 and a return RPC communicates the verification status to the agent program 36. Where the loaded application fails authentication, the corresponding application process 132, 136 can be terminated. Alternately, subsequently received network file system requests 134, 138 from an unauthorized application can be ignored or refused by the modified file system 34. Thus, within an otherwise authenticated user session, the application authentication provisions of the present invention can enforce explicit and functional limitations on user process execution to a well defined set of authenticated applications.

Referring again to FIG. 4, packet control information 114 and application information 122, exposed by packet processing 112 and as received from the agent monitoring process 118, is provided to the authentication and access control process 120 for each network file data packet received by the secure network file access appliance 12. Preferably, the authentication and access control process 120 includes a policy store representing the administratively determined, functionally supported operations of the secure network file access appliance 12. The polices are preferably stored in a high-performance hash table permitting a policy lookup against the information 114, 122 as presented to the authentication and access control process 120. Audit logs of the file requests, as well as error logs and logs of refused operations are produced by the authentication and access control process 120.

Policy sets applicable to a received network file pocket can be progressively discriminated based on any of the data provided in the packet control information 114. In particular, IP layer data provides source and destination IPs, permitting specific access constrains to be defined against defined clients, individually or by subnets. The standard NFS/CIFS layer data provides the requesting user UID and GID, as well as the fully qualified file or directory reference, including generally a mount point, file system path, and applicable file name. The application information 122 layer identifies the user session and provides the execution and parent process identifiers. Where utilized, the application information 122 layer also provides the application name and signature. Successful discrimination of the policy sets against the provided information 114, 122 enables and qualifies the processing of network file packets transported relative to the network storage resources 16.

Preferably, the handling of the various possible types of policy set discrimination failures is defined by the policy sets. Discrimination failures will typically include user authorization failures and unauthorized application execution attempts, unauthorized source IP addresses, and improper file references due to unavailability of the referenced file or lack of adequate user, group or file permissions.

Depending on the nature of the failure, the discrimination failure handling defined by the policy sets will direct the production of detailed audit and error log entries and immediate issuance of administrative alarms, including potentially the automated generation of email and voice messages. The policy set discrimination failure handling preferably further defines the type and content of any NFS/CIFS network file error data packets generated by of the NFS/CIFS state machine 124 and returned to a client 22, 24.

In accordance with the present invention, the progressive discrimination of the policy sets also determines the active application of encryption and compression to the packet payload data 116. For inbound network file data packets from clients 22, 24, any combination of data provided in the control information 114, 122 can be utilized as a signature identifying whether the packet payload data is to be encrypted against a particular encryption key and compressed using a particular compression algorithm. A preferred basic policy set essentially defines the combinations of source IPs, user identifiers, and group identifiers permitted access through the mount point and, further, a default encryption key to be used, particularly for file creation. Multiple policy sets can be applicable to the same mount point, differing in the specification of source IPs, user identifiers, and group identifiers or by specification of additional control information, such as the path specification and file-type extension for the network file identified in the request. The policy sets are administratively managed to ensure that unique combinations of the provided control information resolve to distinct policy sets. Where path specification information is utilized to establish the scope of otherwise matching policy sets, a best match of the path specification, file name, and file extension is preferably used to discriminate the default applicability of data encryption and compression.

Network file packets returned from network storage resources 16 are similarly processed 112 to expose the packet control information 114 and permit a combination of data to be considered in determining whether accompanying packet payload data requires decompression and decryption. While, in accordance with the present invention, encrypted network data packets returned from the network storage resources 16 can be presumed secure, examination of the control information 114 through authentication and access processing 120 enables an appropriate authentication of the source and sequence of the returned network file packets.

Preferably, packet payload data presented to the secure network file access appliance 12 and determined to be encrypted or compressed is processed into a sequence of logical access blocks (LABs) through an encryption and compression process 126. As part of the encryption and compression process 126, each logical access block is, in accordance with one preferred embodiment of the present invention, marked with at least an indirect identifier of the applicable encryption key and compression algorithm. Thus, while the decompression and decryption status of outbound network data packets may be suggested by a source directory specification, the applicable encryption key and compression algorithm is determined based on the encryption and compression identifiers associated with the logical access blocks. Decryption and decompression of the logical access blocks are, therefore, not essentially dependent on the directory specification or other independently alterable aspects of the network file.

Figure 6:
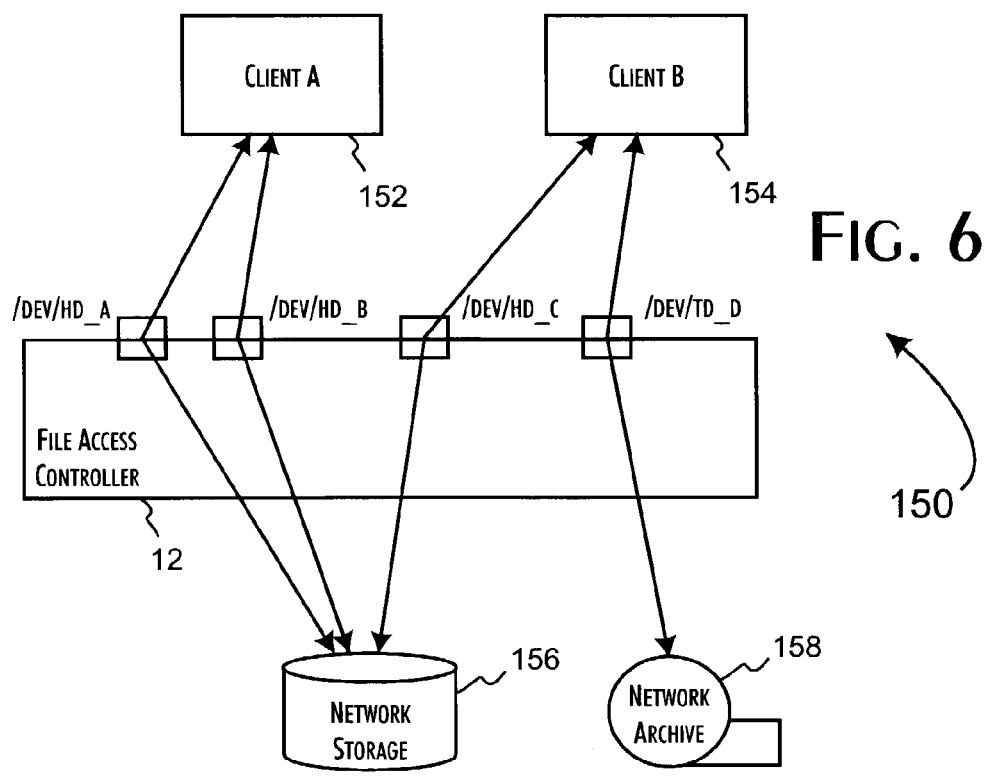
FIG. 6 provides a process interaction diagram illustrating the preferred exposure of network storage resources provided in a preferred embodiment of the present invention to provide multiple qualified views of the underlying file data.

Discrimination of applicable policy sets is, in accordance with the preferred embodiments of the present invention, expanded through the support by the secure network file access appliance 12 of multiple, inbound virtual mount points for the various network storage resources 16. As shown in FIG. 6, multiple virtualized mount points /dev/hd_a, /dev/hd_b, /dev/hd_c, and /dev/td_d may be defined administratively in the configuration of the secure network file access appliance 12. These virtual mount points are independently associated through a defined mapping with the same, as by alias, or separate real mount points supported by various network storage resources 156, 158. Client 152, 154 file requests to mount any of the virtual mount point represented network file systems can be qualified and constrained by policy sets that, at a minimum, serve to validate the existence of the virtual mount point and, optionally, further discriminate for a permitted mount request source IP.

In accordance with the present invention, the virtual mount points further expand the ability to discriminate applicable access policy sets for the client 152, 154 NFS/CIFS network file transactions. Control information 114 provided with each network file packet directed to the secure network file access appliance 12 identifies a target mount point. In accordance with the preferred embodiments of the present invention, the authentication and access control process 120 logically selects an applicable policy set based on the identified virtual mount point. The further constraints represented by the selected policy set are concurrently used to determine how the network file data packet is to be processed. For example, otherwise authorized clients 152, 154 accessing the network resource 156 through the /dev/hd_a virtual mount point may be constrained to read-only NFS/CIFS transactions. The separate policy set associated with the /dev/hd_b virtual mount point may support read-write access by only a well defined set of UIDs, further constrained to NFS/CIFS requests originating from a defined subnetwork.

As another example, read-write access of the network storage resources 156 by the client 154, administratively limited to providing backup services, may be broadly supported through the virtual mount point /dev/hd_c. The policy set associated with the mount point /dev/hd_c preferably enables read-write access to the network storage resources 156 while disallowing decryption of previously encrypted files. The policy set for the virtual mount point /dev/td_d preferably provides for the encryption and compression of previously unencrypted files upon writing to the archival network storage resources 158 and for decryption and decompression on reading. Consequently, a user with limited backup access rights can fully administer the backup and restore of files without breach of the secure storage of previously encrypted files. Thus, distinguishing policy sets based on virtualized mount points provides an extensive degree of flexibility in managing the access rights of a community of clients 152, 154.

Network file packets permitted or refused by operation of the authentication and access control process 120 are signaled to an NFS/CIFS state machine 124, as shown in FIG. 4. The sequences of network file packets representing select file data transactions, including specifically NFS/CIFS transactions, are tracked by the NFS/CIFS state machine 124, in accordance with the present invention, to support the selective encryption and compression of NFS/CIFS network packettransferred file data and manage the attendant changes in the size and structure of network files as stored by the network storage resources 16. Mount and unmount request RPCs are essentially atomic operations between the clients 152, 154 and the secure network file access appliance 12. On receipt of a mount request, access is optionally determined by the authentication and access control process 120 based on the applicable policy set and a determination that the underlying network storage resource 16 identified with the corresponding real mount point is available. An RPC response acknowledging the success or failure of the mount or unmount request is then returned.

The NFS/CIFS state machine 124 tracks the state of each NFS/CIFS transaction processed through the secure network file access appliance 12. The principle NFS/CIFS transactions tracked include Read, Write, and Create. All other NFS/CIFS defined transactions (generically Requests) are also tracked by the NFS/CIFS state machine 124. The Read transaction, following from an inbound read request for file data defined by an offset and range, involves building a corresponding read request with the read offset adjusted back to an encryption and compression block boundary and the range adjusted to allow for the encryption and compression of the file data through to the end of a block boundary. The next states include issuing the read request to the network storage resources 16, receiving a responsive series of network read file data packets, and processing, as needed, to decrypt and decompress the received packet payload data. The final read transaction states include extracting the read file data for the originally requested offset and range and building and returning one or more network file data packets with the read file data.

An NFS/CIFS Write transaction requires a read/modify/write operation where existing stored file data is encrypted or compressed. A write transaction includes receiving a write request, building a lock request with a write lock offset adjusted back to an encryption and compression block boundary and the range adjusted to allow for the encryption and compression of the file data through to the end of a block boundary. The next transaction states include issuing a read request for any initial and final partial file data page including the adjusted write offset and range terminus, decrypting, decompressing and modifying the read data page to include the corresponding parts of the file write data as received from the client, encrypting and, as appropriate, compressing the file write data, and building and issuing corresponding write requests to the network storage resources 156. The final write states include building and sending an unlock request to the network storage resources 156 and building and sending a write request reply to the client.

NFS/CIFS Requests, such as get and set attributes, get access permissions, and make directory, are generally atomic transactions managed by the secure network file access appliance 12 to support infrastructure compatibility with the network storage resources 156. Request transactions involve receiving a client request and building and sending a corresponding request to the network storage resources 156. Upon receipt of a request response from the network storage resources 156, adjustments are made for the reported file size and other attributes of the network file as stored on the network storage resources 156 depending on the particular request involved in the transaction. A corresponding request response is then constructed and sent to the client.

An NFS/CIFS Create transaction involves receiving a file create request, constructing a file management header for the new file, and building and sending a corresponding request to the network storage resources 156. Upon receipt of a request response from the network storage resources 156, a corresponding request response is again constructed and sent to the client.

Figure 7:
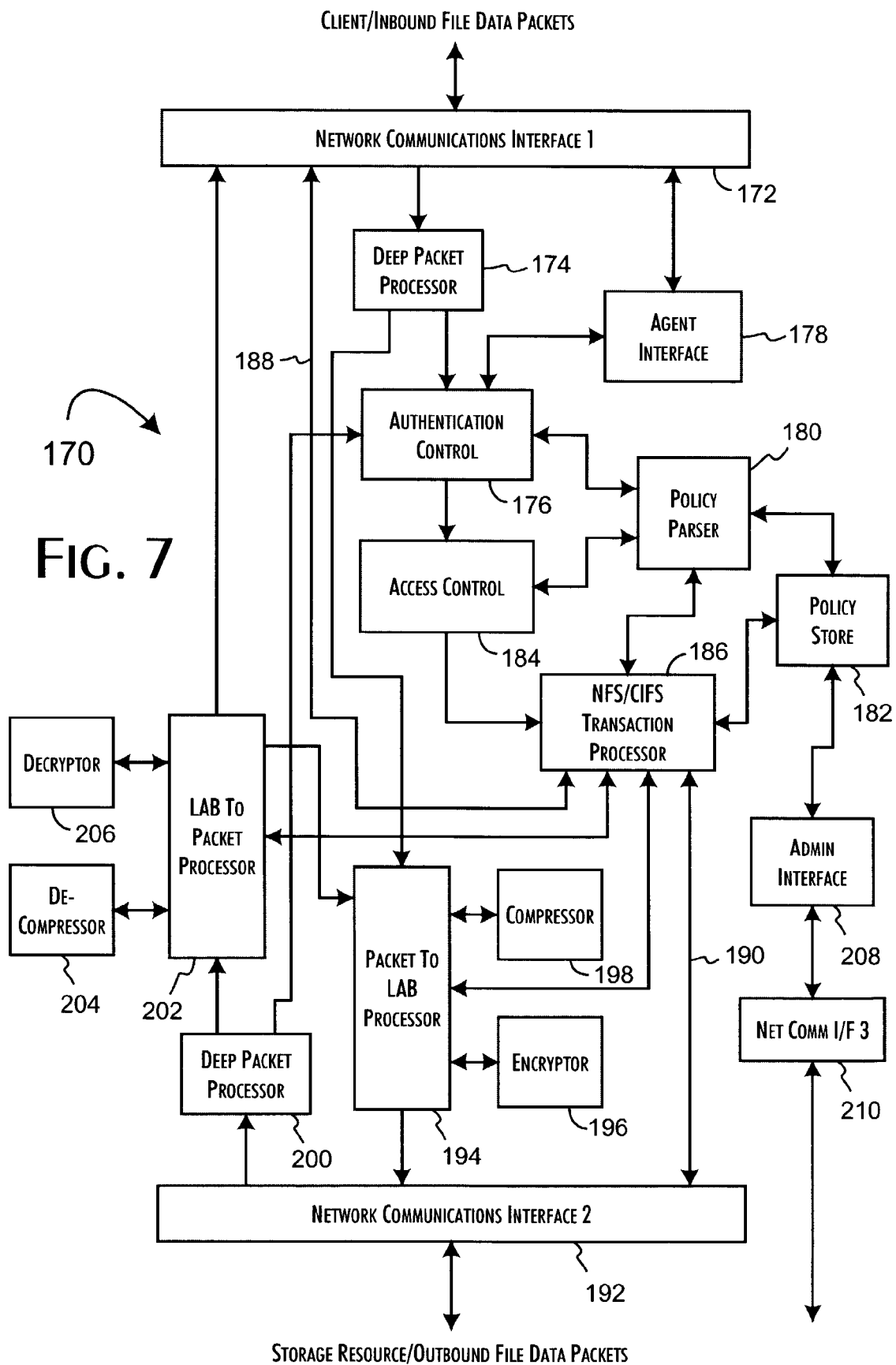
FIG. 7 is a software block diagram illustrating the preferred components implementing network packet protocol processing in accordance with a preferred embodiment of the present invention.

FIG. 7 provides a block diagram and flow representation of the software architecture 170 utilized in a preferred embodiment of the present invention. Inbound network communications are processed through a first network interface 172. Network file data packets received from clients 22, 24 are processed 174 to expose and deliver the network control information 114 for authentication processing 176. Application control information 122 collected from corresponding agent applications 28 are provided through an agent interface 178 in support of the authentication processing 176.

Based on interactions with a policy parser 180, selected elements of the network and application control information 114, 122 are compared with authentication parameters maintained in a policy data store 182. The policy parser 180 preferably implements decision tree logic to determine the level of authentication required for processing the network file request represented by the network file data packet received and whether that level of authentication has been met.

The network and application control information 114, 122 is also processed 184 to determine whether the authorized user is permitted access to the corresponding network storage resources 16. The policy processor 180 and policy data store 182 operate to determine whether the access attributes provided with the network file request are appropriate to enable access to the specific network storage resources 16 identified by the network file request.

While logically separate operations, the authentication and access processing 176, 184 are preferably performed concurrently. In a preferred embodiment of the present invention, a basic decision tree logic sequence considers the logical combination of network file operation requested, virtual mount point, target directory and file specification, client IP, user UID and GID, and the client session and process identifiers. Also considered is application authentication data provided with the network file request and as prior provided by the agent program 36 and the continuity state of the client session as periodically reported by the agent interface 178. Additional state data accumulated in relation to the nature, timing, and frequency of network file access requests is considered. This state data is accumulated by the secure network file access appliance 12 to support static time scheduling and quota controls over network file access requests as well as dynamic traffic shaping of the network file access operations processed through the secure network file access appliance 12. The accumulated state data also permits dynamic detection of patterns in file access requests that threshold qualify as intrusion attempts or other circumstances warranting issuance of an administrative alarm. The decision tree evaluation considers prior sequences of file access requests and thereby qualifies the permitted support of a current network file access request.

Policy data is administratively established to define the set of virtual mount points and the mapping of virtual mount points to real mount points. The policy data can also variously define permitted client source IP ranges, whether application authentication is to be enforced as a prerequisite for client execution or operative response by the secure network file access appliance 12, a limited, permitted set of authenticated digital signatures of execution or response enabled applications, whether user session authentication extends to spawned processes or processes with a different UID or GID, and other data that can be used to match or otherwise discriminate, in operation of the policy parser 180, against the control information 114, 122. This administratively established policy data is logically accessed from the policy store 182 by the policy parser 180 in the evaluation of the network and application control information 114, 122. For the preferred embodiments of the present invention, the decision tree logic and policy data are stored in a hash table permitting rapid evaluation of the network and application control information 114, 122.

The network and application control information 114, 122, as well as the determined results of the authorization and access processing 176, 184 are control inputs to an NFS/CIFS state machine process 186. Non-file data messages, including various NFS/CIFS request and reply messages involved in the read, write, and create NFS/CIFS transaction sequences, are prepared and forwarded 188, 190 directly from the state machine process 186 to the inbound network interface 172 and an outbound network interface 192. Policy data needed to support the generation of network file request and reply data packets, such as virtual to real mount point mapping data, is accessed from the policy data store 182 as needed.

Where ordinary network file data is included in a network file data packet inbound from a client 22, 24, the packet payload data 116 is processed 194 into a sequence of logical access blocks (LABs), provided the network file data packet is qualified through access processing 184 for encryption or compression. The packet payload data 116 of unqualified network file data packets are processed 194 unchanged into network data packets and provided to the network interface 192 for transmission to the network storage resources 16.

As represented in FIG. 8A, the packet payload data of network file data packets corresponds to read and written portions of a file 220 recognized by a file system 36. Individual packet payload data 222, generally as shown in FIG. 8B, is preferably processed 194 into a sequence of logical access blocks 224$_{1-N}$, as shown in FIG. 8C with each logical access block containing a corresponding portion of the packet payload data 222. In an initial embodiment of the present invention, the file management header 226 is virtualized for all files associated with a real mount point and locally stored by the platform 50 effectively as part of the policy data held by the policy store 182. The applicable file management header is retrieved as part of the policy set applicable to the requested virtual mount point. The preferred embodiments of the present invention provide for the creation of a file management header 226 in connection with each Create file NFS/CIFS transaction. In one embodiment, the file management header 226 is created and written to the network storage resources 16 effectively as the first file data block as part of the creation of the file 220 on the network storage resources 16. One or more logical access blocks 224 can thereafter be appended to the file as created on the network storage resources 16 and, subsequently, read and written in random order. Alternately, to optimize the storage and retrieval of data with respect to the network storage resources 16, individual or subsets of logical access blocks 224 and the file management header 226 can be written to separate I/O pages within the same or different file spaces and storage devices. In either case, in accordance with the present invention, qualified file data reads and writes directed to the network storage resources 16 are performed as discrete, logical access block-aligned transfers encompassing the offset and range of a client network file data request.

The file management header 226 and logical access blocks 224 are repackaged in network file data packets as otherwise ordinary blocks of file data for transport to the network storage resources 16. The encryption and/or compression of network file data by secure network file access appliance 12 is thus entirely transparent to the reading and writing of relative to the network storage resources 16 by operation of the present invention.

A preferred structure of the file management header 226 is shown in FIG. 8D and further detailed in Table I below. Preferably, the file management header 226 includes a unique file GUID 228, security parameter index (SPI) 230, and a security signature 232. The file GUID 228 is preferably a SHA-1-based secure hash of data related to the file, such as the client IP, user UID, and file creation time to provide a 160-bit unique random identifier for the file. The security parameter index 230 is preferably a composite of security information including an encryption key identifier (Key) 234, a security options array (Idx) 236, and file related information (Info) 238.

The encryption key identifier 234 is preferably an encrypted representation of the encryption key name utilized to encrypt the file data contained in the logical access blocks of the file 220. Encryption key name/key value pairs are utilized by the secure network file access appliance 12 are administratively defined and stored in the policy data store 182. When, as a product of access processing 184, an encryption key is associated with a new file, the corresponding encryption key name is securely digested, again preferably using the SHA-1 algorithm, and stored in the key identifier field 234 of the file management header 226.

The security parameter index 230 may optionally also include a linked list storing, in encrypted form, the encryption key value for the file 220. Each entry in the linked list includes a public key, encrypted key value tuple. The public key corresponds to a trusted encryption key agent server and the encrypted key value is encrypted with the public key of the agent. On retrieval of the network file data by a different secure network file access appliance 12', the public key identified agent server can be used to recover the encrypted key value.

Providing support for multiple independent agent servers ensures that the encrypted key value can always be recovered.

TABLE I

Management Header Structure

```
Struct MGT_BLOCK {
    U32 File_GUID[5];      // 160-bit unique random GUID for File
    U32 Mgt_Hdr_Ver;       // 32-bit version identifier for this
                           structure
    U32 Size_Mgt_Blk;      // Size of the management block
                           structure
    U32 Options[ ];        // Option include
                           // --IntegrityMode: to compare digital
                           signatures
                           // --OutOfBand: out-of-band meta-data
                           used
                           // --CypherName: encryption algorithm
                           ID
                           // --ComprName: compression
                           algorithm ID
                           // --UserEncryption: Key_GUID is a
                           user key
                           // --GroupEncryption: Key_GUID is a
                           group key
                           // --HaveKeys: has list of agent
                           encrypted keys
    U32 Key_GUID[5];       // 160-bit GUID for Key, generated by
                           //    SHA-1(KeyName)
    U32 Creator_GUID[5];   // 160-bit GUID identifying the file
                           creator
    BYTE Init_Vector[8];   // Initial seed value for LAB encryption;
                           //   encryption seeds are a function of
                           //   Init_Vector + LAB Offset
    U32 Padding[ ];
    U32 CRC;               // To verify management header block
                           integrity
```

TABLE I-continued

Management Header Structure

| | | |
|---|---|---|
| BYTE Signature[128]; | // Signature, signed with PrivKey for<br>// PublicKey_Verify Pre-computed.<br>// Signs only static part of the structure<br>// to avoid overhead on each file under<br>// the same volume/policy. CRC is<br>// signed as the last part so that<br>// changing to any part of the whole<br>// block is detected. | |
| *Key_Table | // Linked list of Public Key, agent<br>encrypted<br>// LAB Symmetric Key tuples | |
| } | | |

The security options array 236 provides an indexed list of the security functions applied to the logical access blocks 224 associated with file management header 226. These options preferably include identifiers of the whether encryption is used and the applicable encryption algorithm, whether compression is used and the applicable compression algorithm, whether the encryption key name lookup should be user or group based, whether an agent encrypted key list is present, and whether tamper detection through digital signature checking is to be enforced. The file related information 238 fields provide storage for various other information, such as a GUID corresponding to the file creator.

Finally, the security signature 232 provides storage for a cyclic redundancy check (CRC) value and digital signature. The CRC value is preferably computed over the binary value of the preceding portions of the file management header 226 to permit block integrity checking. The digital signature is computed for the preceding portions of the file management header 226 including the CRC field to enable detection of tampering with any portion of the file management header 226.

A preferred in-band structure of logical access blocks 224 is also shown in FIG. 8D. The primary fields of a logical access block 224 include a LAB data field 240, a LAB signature field 242, and an optional LAB compression header 244. The LAB data field 240 contains an encrypted and/or compressed portion of the packet payload data 222. The size of the LAB data field 240 is nominally set as a multiple of a natural or convenient block size recognized by the file system 36 and further chosen for block encryption algorithm efficiency.

In accordance with the present invention, segmentation of the packet payload data 222 into the logical access blocks 224 enables reasonably sized blocks of file data to be encrypted and compressed as atomic units. Smaller segments sizes are preferred for obtaining relatively efficient random read/write operations directed to the file 220 as stored by random access devices within the network storage resources 16. Larger segment sizes are preferred for lower processing overhead, greater encryption and compression efficiency, and where the target device within the network strange resources 16 is a streaming access device, such as a conventional tape drive. Preferably, the packet payload data 222 segment size has a block modulo of eight bytes with a minimum size of 512 bytes and a nominally preferred size of 1024 bytes for random access devices. For streaming access devices, larger block sizes on the order of 8096 bytes may be preferred.

Where the last segment of the packet payload data 222 is less than the nominally preferred segment size, a smaller block size is used. This smaller block size is chosen to be the largest modulo eight byte block size that is the same or smaller than the size of the last segment. All but at most seven bytes of the last segment are then block encrypted. Any remaining segment bytes are then XORed with a mask value generated by the encryption of an eight-byte length, zero-value string and then appended to the block encrypted portion of the last segment.

The LAB compression header 242, preferably included only where the packet payload segment held by the logical access block 224 is compressed, includes fields specifying the offset and range of the file data contained within the LAB data field 240. Dependent on the underlying data values and the stream compression algorithm applied, the segment length or range of the packet payload data 222 stored in the LAB data field 240 is variable. The segment length is manipulated to obtain compressed data that closely approaches the preferred LAB data field size. Padding is provided to reach a modulo eight-byte encryption block compatible size. At a minimum, the range value identifies the actual compressed data carried in a completed logical access block 224.

The LAB signature 244 is preferably computed as a secure digest of the LAB data field 240 and, where present, the LAB compression header 242. In the preferred embodiments of the present invention, an SHA-1 algorithm is used to create the LAB signature 244. The security of each logical access block 244, when retrieved to the secure network file access appliance 12, can be assured against tampering by recomputing the secure digest of the LAB data field 240, including any LAB compression header 242, and comparing against the LAB signature 244. For a preferred variant of the present invention, network file data is stored as logical access blocks 224 containing only unencrypted, uncompressed LAB data 240 and LAB signatures 244. While the efficiency of random access over network file data is maintained, modifications potentially due to improper tampering with the contents of the network file are nonetheless detectable on an individual logical access block 224 level. The conventional necessity of reading the entire network file to compute a secure digest to detect tampering is not required.

In an alternate embodiment of the present invention, an error correction trailer 246 is provided to store an ECC value computed over the LAB data field 240, any LAB compression header 242 and the LAB signature 244. ECC values are computed on creation of the logical access blocks 244. Upon retrieval of logical access blocks 244, the ECC value is used to correct bit errors that may occur as a consequence of extended network infrastructure transport of the logical access blocks 244. In particular, bit errors may be introduced by network routers operating at the TCP layer and above. Such infrastructure induced bit errors are otherwise detected from the LAB signature 244, but are then indistinguishable from data tampering. Use of the error correction field 246 serves to independently protect the integrity of the logical access blocks 244.

The file management header 226 and the headers 244 and trailers 242, 246 of the logical access blocks 244 may be included in-band, or in-file, as generally represented in FIG. 8D, as part of the file 220 as ultimately stored by the network storage resources 16. Different in-band layouts can also be used to optimize access to the logical access block data 240. The file management header 226, digital signatures 242, and compression headers 244 can be collected into one or more in-band super blocks. The size of these super blocks and the remaining logical access block data 240 can be sized to optimize I/O performance of the network storage resources 16.

Alternately, and potentially preferred, only the logical access block data 240 is stored by the network storage resources 16 in-band as the network file 220. The file meta-data, including the management header 226 and the headers 244 and trailers 242, 246, corresponding to a network file 220 are stored in a separate, meta-data or shadow file. Any parallel storage structure that maintains the relationship between the shadow file and the in-band network file 220 may be used. The shadow files can be created and stored on the network resources 16 within the same storage space as the network files 220, within a different storage space potentially physically remote from the network files 220, or on the platform 50 provided the parallel association of the shadow files with the network files 220 is maintained. For example, shadow files can be stored in the same directory with the counterpart network files 220 and identified by file names that are a defined permutation of the network file 220 file names. The shadow files can alternately be stored in a parallel directory structure diverging from a defined root or relative root node of the network storage resources 16. In either case, the defined relationship between the shadow files and the corresponding network files 220 is determined and known to the secure network file access appliance 12, which can ensure the parallel reading and writing of the shadow files with corresponding reading and writing of the network files 220.

Referring again to FIG. 7, the packet to LAB processing 194 preferably utilizes, as required, the hardware accelerators 62 to perform encryption 196 and compression 198 over the segments of packet payload data 222. The logical access blocks $224_{1-N}$, together containing the packet payload data 222 of a network file data packet, are then collected into a new network file data packet and passed to the network interface 192 for transport to the networks storage resources 16.

Network file data packets received through the network interface 192 are similarly processed 200 to expose and deliver the network control information 114 for authentication and access processing 176, 184 and logical access blocks $224_{1-N}$ contained in the packet payload data to a logical access block to packet data process 202. The provision for authentication and access processing 176, 184 permits even distributed, potentially client-based network storage devices to be equally secured and made accessible as other network storage resources 16. In the preferred embodiments of the present invention, minimal authentication and access processing 176, 184 is performed for network file data packets received from dedicated network storage resources 16.

The logical access blocks $224_{1-N}$ received in the packet payload data are processed 202 to apply error correction, where the error correction field 246 is present, and validate the integrity of the LAB data fields 240, including the LAB compression headers 244 if present, against the digital signature 242 values. The file management header 226 is read, typically in advance, by the NFS/CIFS state machine process 186 to obtain the encryption key identifier from the field 234 and compression algorithm identity, if applicable from the options index field 236. The LAB data fields 240 are then decompressed 204, if applicable, and decrypted 206. The NFS/CIFS state machine process 186, based on the pending inbound file data read request transaction, identifies an offset and range-selected portion of the combined logical access block $224_{1-N}$ data representing client read requested data. The selected data is then incorporated into a network file data packet and provided to the network interface 172 for transport to the transaction identified client 22, 24.

For the preferred embodiments of the present invention, an administration interface 208 provides access to and configuration of the policy parser 180 and policy data store 182. A network communications interface 210 provides access to the administration interface 208 independent of the inbound and outbound network interfaces 172, 192.

Figure 9:
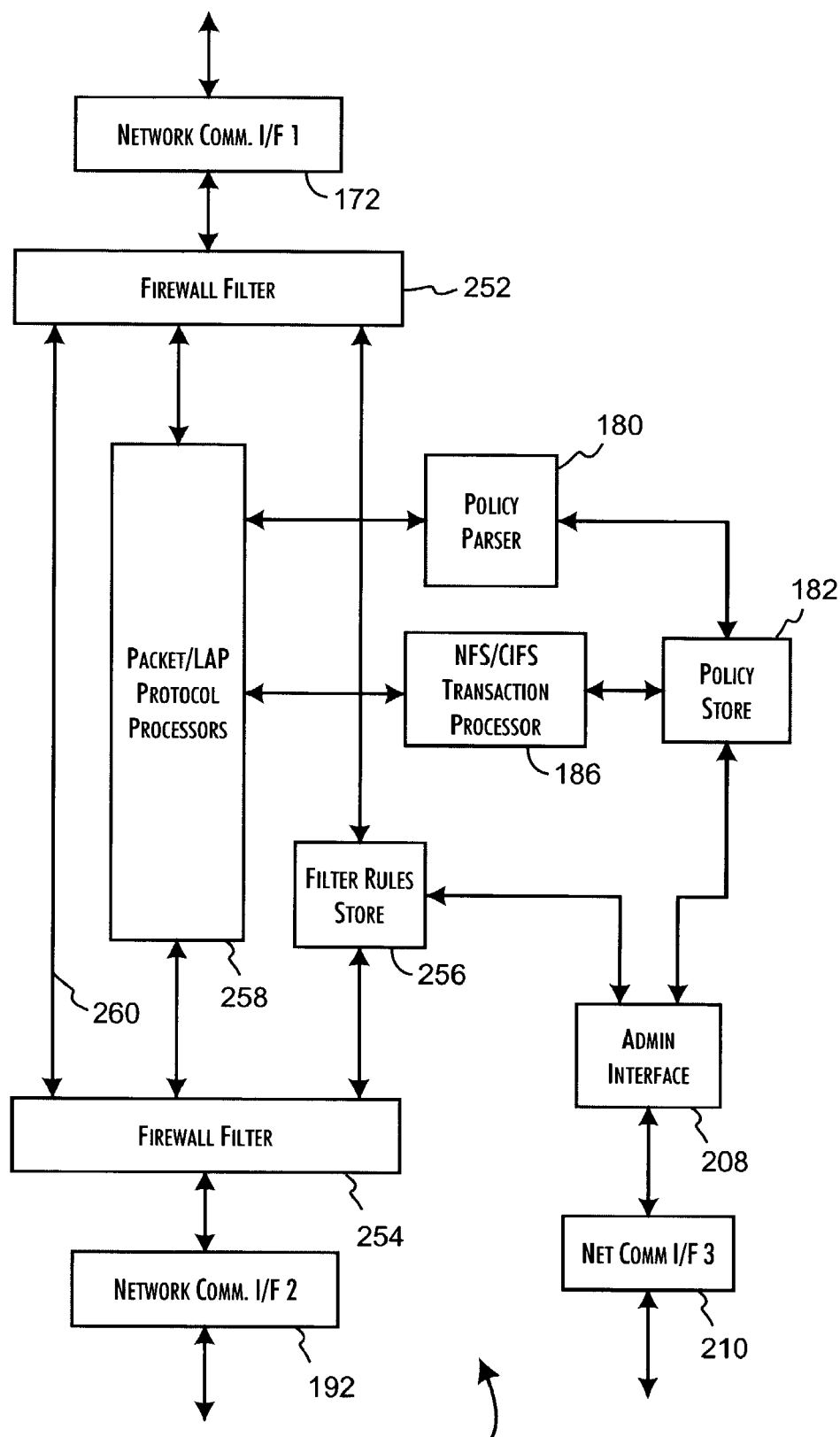
FIG. 9 is a software block diagram illustrating an extended network packet protocol processing including firewall processing in accordance with a preferred embodiment of the present invention.

The software architecture 170 is preferably extended, as shown in FIG. 9, to provide additional security appliance-oriented features. The extended architecture 250 includes IP filter layers 252, 254 implementing firewall-type filtering for network connections made through the network interfaces 172, 192. A filter rules store 256 preferably maintains iptables-type specifications that define the IP addresses, network protocols, and internet ports permitted to pass network packets through the IP filter layers 252, 254. Preferably, the IP filter layers 252, 254, and particularly the inbound IP filter layer 252, is set to reject all connections except those pertaining to network file access operations, including the NFS, CIFS, RPC, and mount protocols. These network file data packets passed by the IP filter layers 252, 254 are directed for packet/LAB processing 258 as performed by the software architecture 170. Unauthorized connection attempts and access requests lacking adequate policy-based permissions are therefore preferentially received, detected, and audited by the software architecture 170.

The flexible analysis capabilities of the authentication and access controls 176, 184 and policy parser 180, particularly based on access to the full set of control information 114, 122, allows a more refined identification of potential abuse patterns and a wider variety of remedial actions, including dynamically blocking specific source IPs, logging detailed information, and issuing real-time administrative alerts. The security and reporting strength of the firewall filters 252, 254 is appropriate for handling connection attempts unrelated to the primary functions of the secure network file access appliance 12. The firewall filters 252, 254 may also be utilized to proxy selected network data packets, including potentially network file data packets, through the secure network file access appliance 12, utilizing a bypass route 260. In the case of VPN 42 and network file access appliance 12' designated source IP addresses and protocols can be identified and appropriately bypassed 260.

For the fixed scale, hardware platform 50, the firewall filters 252, 254 are preferably implemented through the kernel execution of the operating system iptables module by the main processors 54. On the scalable hardware platform 80, the firewall filter layers 252, 254 are preferably implemented on the ingress and egress processors 86, 88, with the bypass routed network packets being passed directly between the ingress and egress processors 86, 88. The filter rules maintained in the filter rules store 256 are administered through the administration interface 208.

Figure 10A:
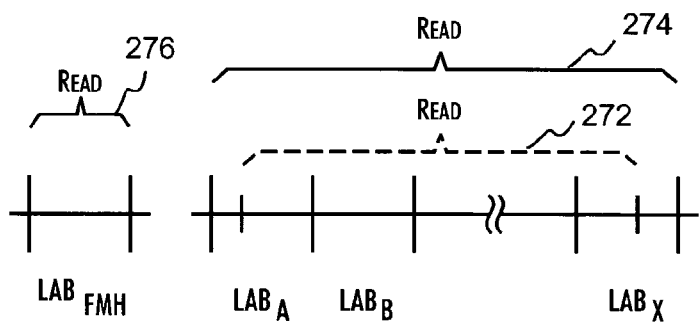
FIGS. 10A-B illustrate the process flow of a file system read request and response performed in accordance with a preferred embodiment of the present invention.

An NFS/CIFS read transaction 270, structured in accordance with a preferred embodiment of the present invention, is shown graphically in FIG. 10A. A read target file, consisting of a file management header 226 and a sequence of logical access blocks $224_{1-N}$, exists on the network storage resources 16. In general, an inbound read request identifies an offset and range of data to read 272. Outbound read requests are issued to read 274, 276 the file management header 226 and an encompassing, block-aligned sequence of logical access blocks $224_{A-X}$. The read request 276 retrieves the requested logical access blocks $224_{A-X}$ in a series of one or more network file data packets, which are then processed to complete the inbound read request by returning one or more network file data packets containing the read request data 272.

Figure 10B:
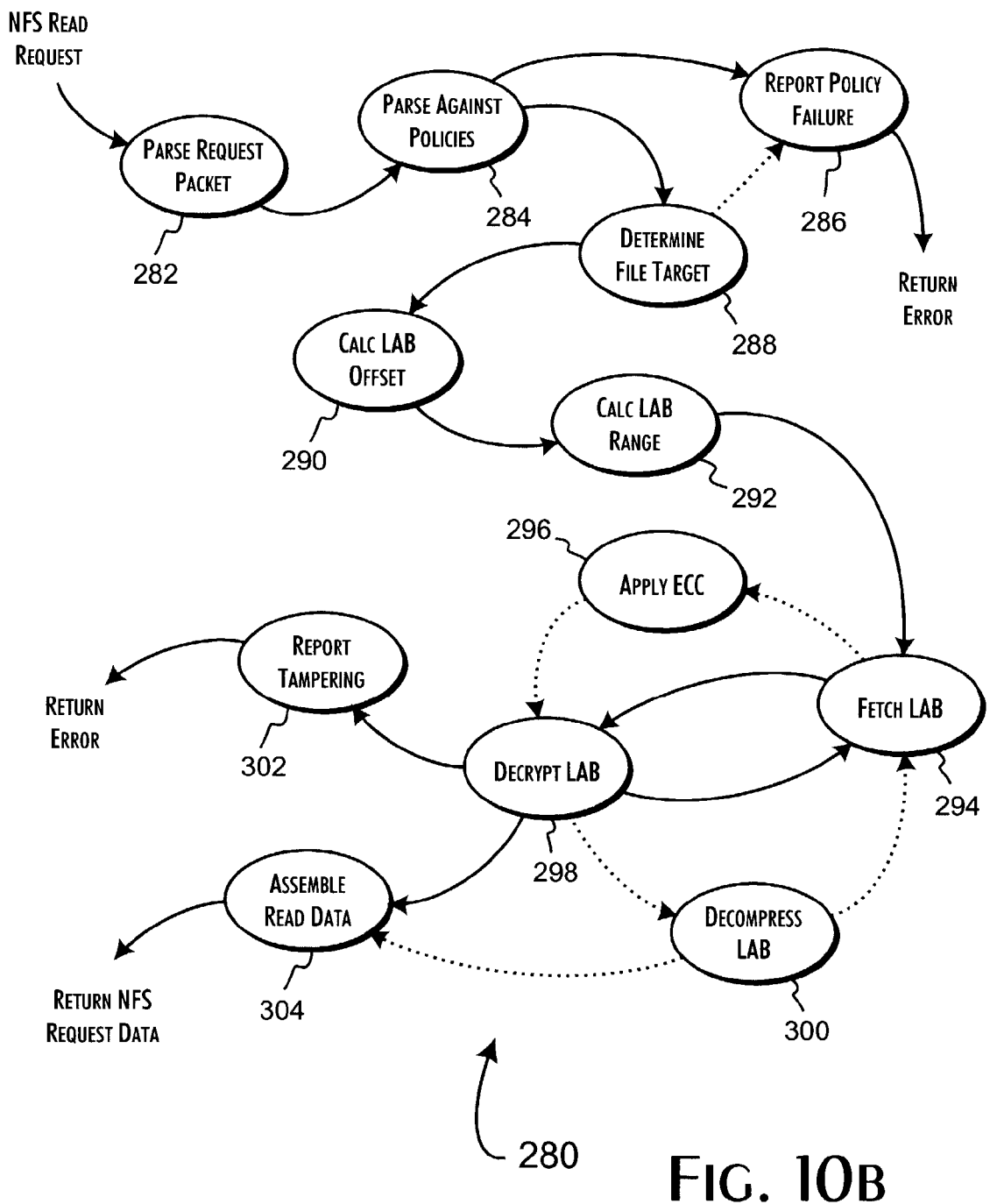

The specific processing 280 associated with an NFS/CIFS read transaction 270 is shown in FIG. 10B. The secure network file access appliance 12, on receiving a firewall-filtered file data read request, exposes 282 and parses 284 the network control information 114 against the policy rules and data 182, 184. A policy compliance failure is reported 286 by return issuance of an NFS/CIFS appropriate reply network data packet.

Where the read request complies with the defined policy requirements, the file related access control information is optionally read 288 from the network storage resources 16 to confirm existence of the file and evaluate applicable read data permissions. Where the permissions check is performed and fails, nonexistence of the file or inadequate permissions are reported 286 without issuing the read file request to the network storage resources 16. The file meta-data, including the file management header 226 for the request target file, is also read 288 from the network storage resource 16. A block-aligned logical access block offset 290 and range 292 are determined and used to create and issue an outbound read request directed to the network storage resources 16. The read data offset is adjusted to account for the size of the file management header 226 as stored at the beginning of the file. Where the logical access blocks $224_{A-X}$ contain compressed data, file data reads of the LAB compression headers 244 may be required to determine adjustments to both the read data offset and an encompassing read request range.

As the requested logical access blocks $224_{A-X}$ are received 294, error correction is applied 296, depending on whether the LAB ECC field 246 is present, decrypted 298 utilizing the key associated with the key name determined from the key identifier field 234 of the file management header 226, and decompressed 300, depending on whether the file management header 226 includes the compression option and identifies a corresponding algorithm. The LAB digital signatures 242 are used to check the integrity of the retrieved file data. A failure of the integrity check for any of the logical access blocks $224_{A-X}$ may result in a re-reading of some or all of the logical access blocks $224_{A-X}$, to protect against soft-errors, with persistent errors being ultimately reported by the return issuance of an NFS/CIFS appropriate error network data packet. Preferably, both soft and persistent errors are logged by the secure network file access appliance 12. Persistent errors, recognized through the operation of the NFS/CIFS state machine processing 186 of the inbound read request, are further preferably asserted against the policy parser 180 for evaluation and subsequently issued 302 as a tampering alert message through the administrative interface 208. Finally, as file data is received and processed in response to the outbound read request, the file data identified in the inbound read request is assembled 304 into one or more reply network file dot packets and returned.

An NFS/CIFS create file transaction 310, as shown graphically in FIG. 11A, preferably operates to create a new file containing a new file management header 226. As further detailed in FIG. 11B, a create file request process 320 initially exposes 322 and parses 324 the network control information 114, with any policy compliance failures resulting in the return issuance of an NFS/CIFS appropriate reply network data packet. Provided the file create request complies with the defined policy requirements, directory information is optionally read 328 from the network storage resources 16 to obtain the target file creation permissions. Where the permissions check is performed and fails, non-existence of the target directory and inadequate permissions are reported 326 without asserting a create file request to the network storage resources 16.

A file management header 226 is then created 330. Through operation of the NFS/CIFS state machine processing 186, the policy parser 180, based on the stored values provided from the policy data store 182, generates and provides the necessary values for the security parameter index 230. In particular, the policy parser 180 preferably associates encryption keys and compression choices against directory specifications, including mount points. Thus, the target location of the file to be created is utilized to determine whether encryption and compression are to be applied and the applicable key and algorithms for implementation. A secure identifier based on the key name and compression and compression algorithm identifiers are computed and stored in the new file management header 226 along with computed CRC and signature values.

The NFS/CIFS state machine 186 next provides for the creation and issuance 332 of an NFS/CIFS create file request to the network storage resources 16 utilizing the directory specification provided by the inbound create file request. For in-band storage of the file management header 226, an NFS/CIFS file write request, containing the file management header 226, is then created and issued 334 to the network storage resources 16. Where a shadow meta-data file is designated for use, an NFS/CIFS file create and write requests, the latter containing the file management header 226, are created and issued 334 to the network storage resources 16 to create the shadow file. Finally, an NFS/CIFS appropriate create file reply network data packet is returned to the client.

Figure 12A:
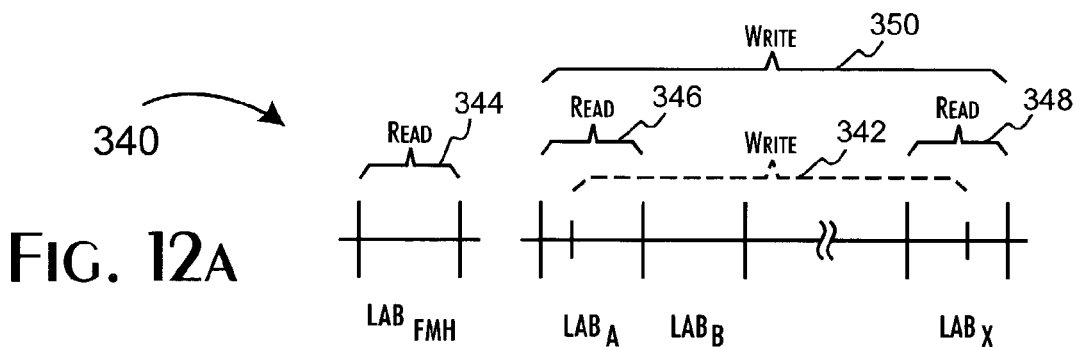
FIGS. 12A-B illustrate the process flow of a file system write request and response performed in accordance with a preferred embodiment of the present invention.

An NFS/CIFS write transaction 340, structured in accordance with a preferred embodiment of the present invention, is shown graphically in FIG. 12A. The write of file data to an existing file in the network storage resources 16 uses a read, modify, write procedure. An inbound write data request specifies an offset and range of write data 342 that is provided in a transaction sequence of one or more network file data packets. In most instances, the write request data will be unaligned to the logical access blocks $224_{1-N}$ existing in the stored file. The file management header 226 and any partially overlapped logical access blocks $224_A$, $224_X$ are preemptively read 344, 346, 348, permitting the overlapped logical access blocks $224_A$, $224_X$ to be decrypted and decompressed as required. An overlay of the inbound write data 342 with the block-aligned read data is then performed. The resulting block-aligned write data is then processed into logical access blocks $224_{A-X}$ and written 350 in a write transaction sequence of one or more network file data packets to the network storage resources 16.

Figure 12B:
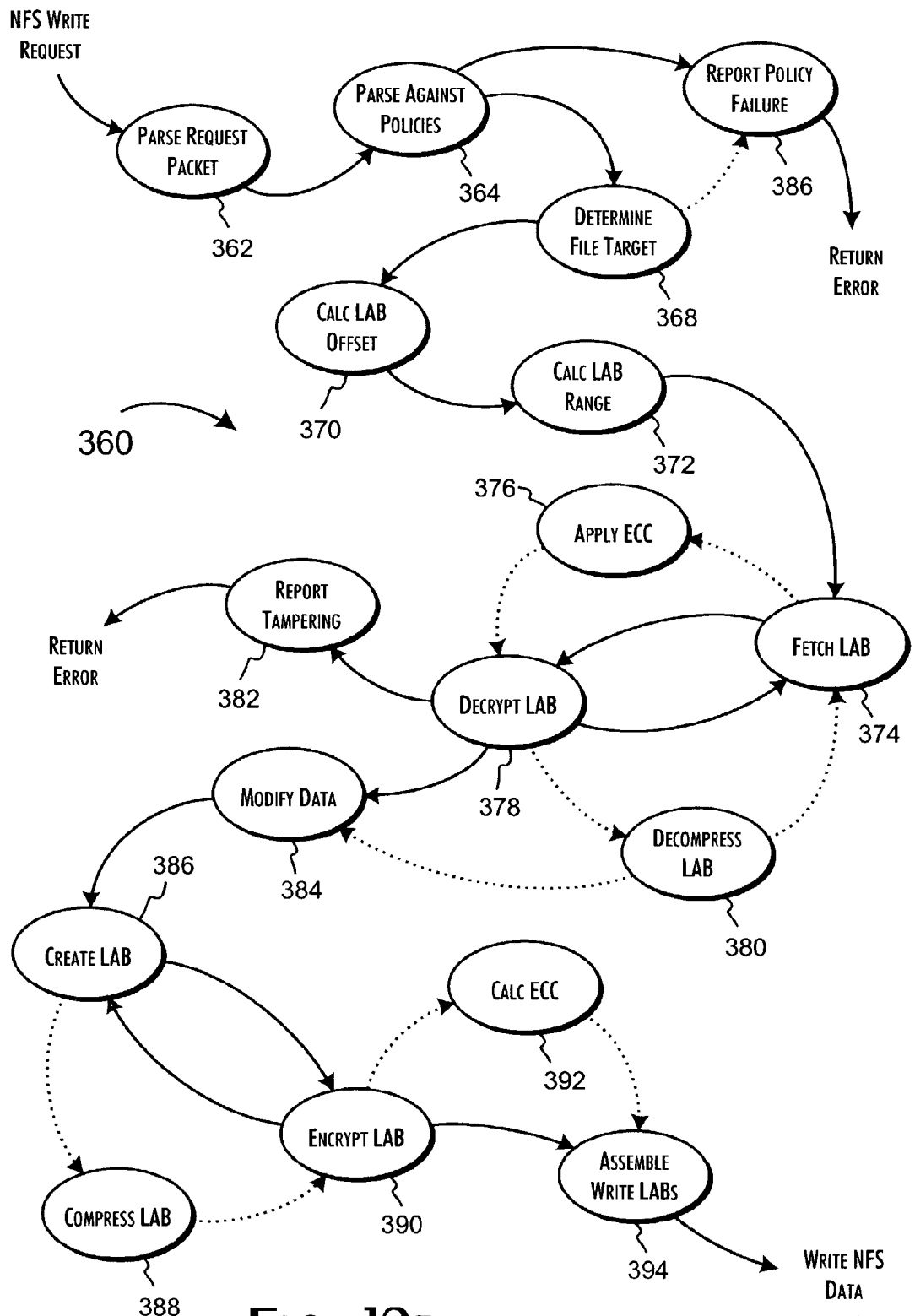

The preferred process 360 of performing an NFS/CIFS write request transaction is shown in FIG. 12B. The received write file data request is received and processed 362 to expose the network control information 114. This information is then parsed 364 against the established policies 180, 182, with any compliance failures being reported 386. The network control information 114 is then further processed 368 to identify the target file stored by the network storage resources 16, create and issue read requests to obtain the file meta-data, including the file management header 226. The logical access block offset and range are then determined 370, 372, adjusting as needed for the presence of the file management header 226 and compression of the logical access block 224 contained data. A file lock is asserted against the range logical access blocks $224_{A-X}$. The initial and terminal logical access blocks $224_A$, $224_X$ are read 374 from the network storage resources 16, corrected 376 if the LAB ECC field 246 is present, decrypted 378, and decompressed 380, as needed. Integrity failure errors are reported 382. Data from the terminal logical access blocks $224_A$, $224_X$ are merged 384 with the write data 342 and the combined data is resegmented 386, compressed 388 as appropriate, and encrypted 390. As applicable, LAB ECC values are computed and added 392 to the assembled 394 series of logical access blocks $224_{A-X}$. As the logical access blocks $224_{A-X}$ are assembled, one or more write network file data packets are constructed and sent to the network storage resources 16. Once the writing the logical access blocks $224_{A-X}$ has completed, the file lock is released.

Thus, a system and methods for providing an efficient, secure network file storage protocol and secure file data storage format supporting encryption, compression, and tampering controls over file data stored by remote file data stores has been described. In view of the above description of the preferred embodiments of the present invention, many modifications and variations of the disclosed embodiments will be readily appreciated by those of skill in the art. It is therefore to be understood that, within the scope of the appended claims, the invention may be practiced otherwise than as specifically described above.

The invention claimed is:

1. A method of securing a network data file, said method comprising the steps of:
   a) receiving a first network data packet including payload file data corresponding to a predetermined network data file stored on a predetermined network storage resource;
   b) segmenting said payload file data into a plurality of data blocks;
   c) processing each of said plurality of file data blocks through a block encryption unit, said processing step selectively implementing a first function selected from a group of functions including
      i) generating digital signatures for each of said plurality of file data blocks,
      ii) encrypting each of said plurality of file data blocks,
      iii) encrypting and generating digital signatures for each of said plurality of file data blocks,
      iv) compressing and encrypting each of said plurality of file data blocks, and
      v) compressing, encrypting, and generating digital signatures for each of said plurality of file data blocks;
   d) generating a second file network data packet including said plurality of file data blocks as processed by said processing step; and
   e) forwarding said second file network data packet to said predetermined network storage resource for storage as a corresponding portion of said predetermined network data file.

2. The method of claim 1 wherein said payload file data corresponds to an offset and range of said predetermined network data file and wherein said method, following said step of receiving, further comprises the steps of:
   a) determining a pre-existing block-aligned portion of said predetermined network data file corresponding to said offset and range;
   b) retrieving a terminal file data block of said pre-existing block-aligned portion of said predetermined network data file; and
   c) overlaying said terminal file data block with said payload file data.

3. The method of claim 2 wherein said step of retrieving implements a second function selected from said group, wherein said group further includes (i) decrypting said terminal file data block, and (ii) decrypting and decompressing said terminal file data block.

4. The method of claim 3 further comprising the step of referencing file meta-data, stored in correspondence with said predetermined network data file, to obtain an encryption key for use in said steps of processing and retrieving.

5. The method of claim 4 further comprising, conditioned on said first function generating digital signatures for each of said plurality of file data blocks, the steps of:
   a) storing digital signatures for each of said plurality of file data blocks as file meta-data in correspondence with said predetermined network data file; and
   b) verifying the digital signature of said terminal file data block as obtained from said file meta-data against a digital signature generated in connection with said step of retrieving.

6. A method of encrypting network data files, said method comprising the steps of:
   a) receiving a first network data packet including payload file data corresponding to a predetermined network data file stored on a predetermined network storage resource;
   b) obtaining an encryption key associated with said predetermined network data file;
   c) segmenting said payload file data into a plurality of file data blocks;
   d) block encrypting each of said plurality of file data blocks with said encryption key;
   e) generating a second file network data packet including said block encrypted plurality of file data blocks; and
   f) forwarding said second file network data packet to said predetermined network storage resource.

7. The method of claim 6 further comprising the steps of computing a plurality of encrypted file data block digital signatures corresponding to said block encrypted plurality of file data blocks and storing said plurality of encrypted file data block digital signatures on said predetermined network storage resource.

8. The method of claim 7 wherein said step of forwarding includes forwarding said plurality of encrypted file data block digital signatures to said predetermined network storage resource.

9. The method of claim 8 wherein said step of computing associates each of said plurality of encrypted file data block digital signatures with the corresponding one of said block encrypted plurality of file data blocks for inclusion in said second file network data packet.

10. The method of claim 7 further comprising the step of associating a file header with said predetermined network data file and wherein said file header includes an identification of said encryption key, said step of obtaining said encryption key including retrieving said file header.

11. The method of claim 10 wherein said step of block encrypting utilizes said encryption key and an encryption seed value and wherein said file header includes an identification of said encryption seed value.

12. The method of claim 7 wherein said step of obtaining includes retrieving a meta-data header including an encryption key identifier, said method further including the step of recovering said encryption key based on said encryption key identifier.

13. The method of claim 12 wherein said plurality of encrypted file data block digital signatures are in correspondence with said meta-data header.

14. The method of claim 13 wherein said meta-data header and said plurality of encrypted file data block digital signatures are stored in a meta-data file on said predetermined network storage resource.

15. A method of recovering encrypted file data from a network storage resource, said method comprising the steps of:
   a) receiving a network file data read request by a network portal appliance, said network file data read request identifying a defined portion of a network file stored by a network storage resource;
   b) determining a block file data portion encompassing said defined portion of said network file;
   c) first retrieving an encryption key corresponding to said network file;
   d) second retrieving said block file data portion from said network storage resource;
   e) decrypting said block file data portion utilizing said encryption key; and
   f) returning, in response to said network file data read request, said defined portion of said network file.

16. The method of claim 15 wherein said step of determining includes obtaining encryption meta-data including identifications of said encryption key and an encryption block size of said network file.

17. The method of claim 16 wherein said step of determining includes third retrieving said encryption meta-data from said network storage resource.

18. The method of claim 17 wherein said encryption meta-data is stored by said network storage resource in direct correspondence with said network file.

19. The method of claim 18 wherein said encryption meta-data is stored as part of said network file.

20. A network appliance providing for the secure transport and storage of encrypted file data by network storage resources, said network appliance comprising:
   a) a network file access processor defining the storage of a network file by a network storage resource to include predefined encryption meta-data and a plurality of encrypted file data blocks, said network file access processor supporting a first network file access transaction with a client computer system and a second network file access transaction with said network storage resource, said second network file access transaction including retrieval of said predefined encryption meta-data and further corresponding to a modified said first network file access transaction based on said predefined encryption meta-data; and
   b) a network protocol processor, responsive to said network file access processor, operative to selectively convert network packet payload data between a sequence of encrypted data blocks and a defined portion of said network file.

21. The network appliance of claim 20 wherein said network protocol processor provides for the decomposition of network packet payload data into a plurality of data blocks of size defined by said predefined encryption meta-data, and encryption of each of said plurality data blocks utilizing an encryption key identified by said predefined encryption meta-data.

22. The network appliance of claim 20 wherein said first network file access transaction defines a read file access request against a defined portion of said network file,
   wherein said network file access processor is operative in said second network file access transaction to retrieve said predefined encryption meta-data and a sequence of encrypted data blocks encompassing said defined portion of said network file, and
   wherein said network protocol processor is operative to obtain an encryption key based on said predefined encryption meta-data and decrypt said sequence to supply said defined portion in completion of said first network file access transaction.

23. The network appliance of claim 20 wherein said first network file access transaction defines a write file access request against a first defined portion of said network file,
   wherein said network file access processor is operative in said second network file access transaction to retrieve said predefined encryption meta-data and a sequence of encrypted data blocks determined to be overwritten in completion of said second network file access transaction, and
   wherein said network protocol processor is operative to obtain an encryption key based on said predefined encryption meta-data, decrypt said sequence to provide a second defined portion of said network file, overlay said second defined portion with said first defined portion to provide a third defined portion of said network file, decompose said third defined portion into a plurality of data blocks of size defined by said predefined encryption meta-data, encrypt each of said plurality data blocks utilizing said encryption key, and supply said plurality of encrypted data blocks to said network storage in completion of said second network file access transaction.

24. A network file access appliance provided as a gateway within a network infrastructure and implementing a storage protocol to transparently secure file as data stored by network storage resources, said network file access appliance comprising:
   a) a network file transaction processor operative to responsively manage a first network file transaction for returning first network file data to a client computer system and execute a second network file transaction to retrieve second network file data from a network storage resource, wherein said second network file data includes a plurality of encrypted data blocks and file meta-data, including an encryption key identifier, said network file transaction processor being further operative to resolve said encryption key identifier into an encryption key specific to said plurality of encrypted data blocks; and
   b) a network file data processor, responsive to said network file transaction processor and including a block decryptor, operative to decrypt said plurality of encrypted data blocks and selectively return said first network file data.

25. The network file access appliance of claim 24 wherein said file meta-data is uniquely associated with said plurality of encrypted data blocks.

26. The network file access appliance of claim 25 wherein said file meta-data and said plurality of encrypted data blocks are stored separately on said network storage resource, said second network file transaction providing for the coordinated retrieval of said file meta-data and said plurality of encrypted data blocks.

27. The network file access appliance of claim 25 wherein said file meta-data and said plurality of encrypted data blocks are stored together in a file on said network storage resource, said second network file transaction mapping between said first and second network file data.

28. The network file access appliance of claim 25 wherein said meta-data includes a digital signature for each said plurality of encrypted data blocks.

29. The network file access appliance of claim 28 wherein said file meta-data includes a compression identifier and wherein said network file data processor includes a data decompressor selectively operative dependent on said compression identifier to decompress said plurality of encrypted data blocks.

30. The network file access appliance of claim 29 wherein said file meta-data includes compression data respectively for said plurality of encrypted data blocks, said second network file transaction providing for the coordinated use of said compression data for decompression of said plurality of encrypted data blocks.

31. The network file access appliance of claim 30 wherein said file meta-data includes error correction information computed for each of said plurality of encrypted data blocks.

* * * * *